United States Patent [19]

Wachter

[11] Patent Number: 5,051,385

[45] Date of Patent: Sep. 24, 1991

[54] MONODISPERSED MESOPOROUS CATALYST MATRICES AND FCC CATALYSTS THEREOF

[75] Inventor: William A. Wachter, Baton Rouge, La.

[73] Assignee: Exxon Research and Engineering Company, Florham Park, N.J.

[21] Appl. No.: 410,558

[22] Filed: Sep. 21, 1989

Related U.S. Application Data

[63] Continuation-in-part of Ser. No. 215,163, Jul. 5, 1988, abandoned.

[51] Int. Cl.$^5$ .......................... B01J 29/06; B01J 21/12
[52] U.S. Cl. ...................................... 502/64; 502/235; 502/263
[58] Field of Search ................. 502/235, 263, 64

[56] References Cited

U.S. PATENT DOCUMENTS

| | | | |
|---|---|---|---|
| 3,169,931 | 2/1965 | de Rosset et al. | 502/235 |
| 3,210,294 | 10/1965 | Chomitz et al. | 502/235 |
| 3,252,917 | 5/1966 | Mindick et al. | 502/235 |
| 3,433,748 | 3/1969 | Magee, Jr. et al. | 502/235 |
| 3,496,116 | 2/1970 | Anderson et al. | 502/235 |
| 3,974,099 | 8/1976 | Lussier et al. | 502/235 |
| 4,780,446 | 10/1988 | Nozemack et al. | 502/235 |

FOREIGN PATENT DOCUMENTS 105435  4/1984  European Pat. Off. ............ 502/235

*Primary Examiner*—Carl F. Dees
*Attorney, Agent, or Firm*—Henry E. Naylor

[57] ABSTRACT

Disclosed are monodispersed mesoporous aluminosilicate matrix materials and their preparation. The matrix materials have pore diameters between about 100 and 500 Angstroms and alumina contents between about 5 and 40 wt. %. Zeolites can be incorporated with the matrices to produce catalysts suitable for fluid catalytic cracking.

31 Claims, 12 Drawing Sheets

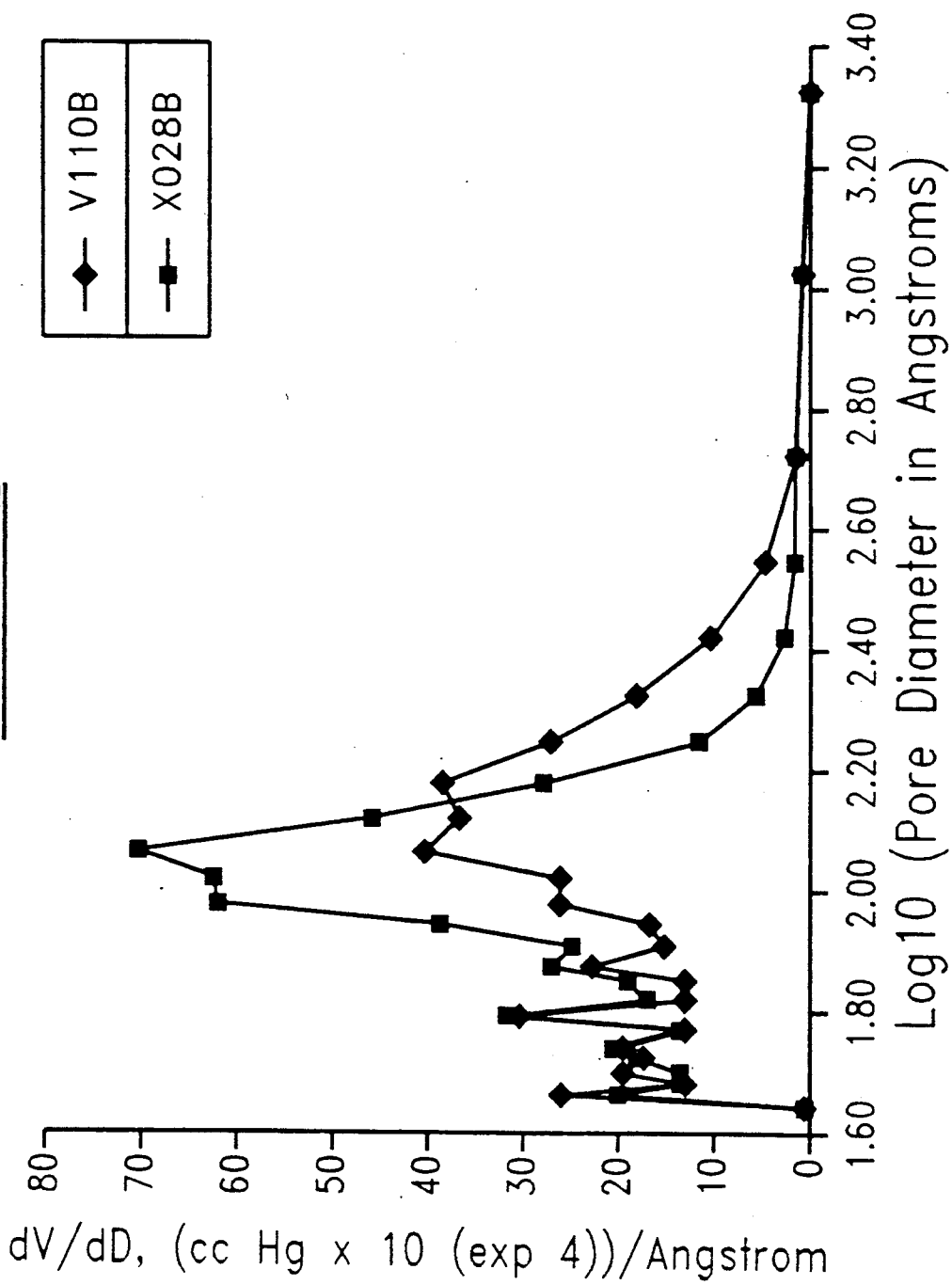

MONODISPERSED MESOPOROUS CATALYST MATRICES AND FCC CATALYSTS THEREOF

CROSS REFERENCE TO RELATED APPLICATIONS

Continuation-in-part of Application Ser. No. 215,163 filed July 5, 1988, now abandoned. BACKGROUND OF THE INVENTION

1. Field of the Invention

The present invention relates to monodispersed mesoporous aluminosilicate matrix materials and their preparation. The matrix materials have pore diameters between about 100 to 500 Angstroms (A) and alumina contents between about 5 to 40 wt. %. Zeolites can be incorporated into the matrix materials to produce catalyst compositions suitable for use in fluid catalytic cracking (FCC) of hydrocarbons. The catalyst compositions produce less coke and therefore more liquids.

2. Background of the Invention

Fluid catalytic cracking catalysts generally contain crystalline aluminosilicate components such as zeolites, active porous inorganic oxide components such as aluminas, inert components such as clays of the kaolin type, and inorganic oxide matrices formed from amorphous gels or sols which, on drying, bind the other components together. It is desirable that the matrix be active, attrition-resistant, selective with respect to the production of liquids, and not readily deactivated by metals. Until recently, the zeolite content of FCC catalysts was low enough that the pore structure of the matrix was tailored to favor activity and selectivity over strength, or attrition resistance. However, present FCC catalysts contain more zeolitic material, as much as 60 wt %, thus requiring that the pore structure of the matrix be more attrition-resistant while remaining active and selective.

Matrices of early FCC catalysts were simply amorphorous gel catalysts, i.e., silica-alumina or silica-magnesia. With time, new matrices based on silica sols and alumina sols were developed. Catalysts bound together with these sols did not have as desirable a matrix pore structure as that found in the older amorphorous gel catalysts; however, they were significantly more attrition-resistant.

As refiners sought to increase the profitability of their FCC units by increasing the feed rate and/or adding higher molecular weight feeds, they had to increase the reactor temperature and/or the activity of the catalyst to increase the reaction rate. This combination of factors (heavier feeds, more active catalysts, higher temperatures) eventually reduces the selectivity of the reaction to naphtha and increases the yield of coke as molecules being to undergo secondary reactions before they diffuse out of the pore system of the catalyst.

Diffusional constraints in FCC reactions lower the yield of intermediate products such as naptha and increase the yield of less valuable stable end-products such as coke and gas.

Further, at the time catalysts needed to be more porous to prevent diffusional constraints, they also needed a higher degree of attrition resistance to handle the increasingly abrasive and hydrothermally extreme environments found in commercial units. Because of the limitations of conventional amorphorous gels and sols in balancing these two incompatible objectives, it has been suggested to employ monodispersed (single size) pore size materials as matrices. For example, U.S. Pat. Nos. 4,217,240; 4,257,874; and 4,272,409 teach the preparation of porous aluminosilicate sols having a uniform pore size and uniform particle size. These porous aluminosilicate sols are prepared at a pH of about 9 to 12 by the addition of a solution of sodium silicate and sodium aluminate to a silica or silicaalumina sol so that the sol does not gel prior to drying. The resulting material has 80% of its pore volume within 40% of the median pore diameter which can vary between 45 and 250A. While the resulting monodispersed materials of these references have advantages over the more conventional amorphorous gels and sols used as matrix materials, there is still a need in the art for further optimization of the balance between porosity and strength, especially for relatively high-content zeolite FCC catalysts.

Several patent exist on the use of mesoporous catalysts in fluid catalytic cracking. Among these is U.S. Pat. No. 4,588,702 which teaches a catalyst which has a pore volume greater than 0.4 cc/g as determined by water titration with 40-70% of all pores in the 100-1000 Angstroms diameter region, less than 35% of the pores between 20-100 Angstroms in diameter and at least 10% of all pores with diameters greater than 1000 Angstroms. The zeolite content of this catalyst lies between 8 and 25% by weight. Another zeolite-containing silica-alumina hydrogel-based catalyst with mesoporosity is disclosed in U.S. Pat. No. 4,226,743. On steaming, this catalyst has a maximum in dS/dD (where dS is the change in surface area and dD is the change in pore diameter, which will be discussed in more detail later) of 2.5 $m^2$/g/Angstrom at a pore diameter of 30 Angstroms. dS/dD monotonically decreases from this point to ca. 0.4 at 100 Angstroms and <0.2 at 125 Angstroms.

Another series of mesoporous FCC catalysts based on silica-alumina matrices containing zeolite are taught in U.S. Pat. Nos. 4,215,015, 4,299,733, and 4,333,821. Nitrogen desorption analysis shows dV/dD (where dV is the incremental intrusion volume which will be discussed in more detail later) drops from 24 to $20 \times 100$ exp $(-4)$ cc/Angstrom/g between 100 and 150 Angstroms and thereafter falls off sharply to a value less than $10 \times 10$ exp $(-4)$ cc/A/g above 170 Angstroms for these materials. Also, a mesoporous silica alumina is taught in U.S. Pat. No. 4,310,441 which has more than 0.6 cc/g in pores between 20 and 600 Angstroms in diameter with less than 50% of the desorption volume between 20 and 600 Angstroms in pores with 20 to 50 Angstrom diameters. Further, this silica-alumina gel has more than 20% and less than 75% of the desorption pore volume of pores in the 20 to 600 Angstrom diameter region in pores of 50 to 200 Angstroms diameter. The silica/alumina mole ratio of this gel is between 1 and 3.

The catalysts of the present invention have zeolite contents of greater than 18%. The Si/Al ratio of matrices used to make catalysts of this invention is greater than 3. Pore volume of catalysts of this invention as determined by nitrogen adsorption at saturation are less than 0.55 cc/g for catalysts with 20% zeolite and less than 0.65 cc/g for catalysts with 40% zeolite by weight. All catalysts of this invention have more than 70% of their pore volume in the 100-1000 Angstrom region as measured by mercury intrusion when normalized with the pore volume obtained with nitrogen at saturation and its boiling point. Catalysts of this invention typically have values for dV/dD, as measured by mercury, of greater than $10 \times 10$ exp $(-4)$ cc/Angstroms g above 200 Angstroms. Reasonable agreement between mercury intrusion and nitrogen desorption results have been reported in Langmuir 2,151–154 (1986). Further, the catalysts of this invention do not have a monotonic decrease in dV/dD as the pore size increases; rather they show a maximum in the dV/dD plot between 100 and 500 Angstroms. The catalysts of this invention also have a maximum in dS/dD as measured by mercury between 100 and 400 Angstroms of at least 018 m$^2$/g-Angstrom.

SUMMARY OF THE INVENTION

In accordance with the present invention, there is provided a monodispersed mesoporous aluminosilicate matrix material comprised of about 5 to 40% alumina with the balance being silica, which matrix material has a pore size distribution from about 100 to about 500 Angstroms; and wherein there is the substantial absence of microporous alumina-containing species. That is, there is a substantial absence of an $^{27}$Al MASNMR peak after steaming at 1400° F. for 16 hours, which is no more than 10% greater than any other peak, and a surface area less than about 300 m$^2$/g.

Also in accordance with the present invention is a process for preparing the above monodispersed mesoporous aluminosilicate matrix materials by: (a) blending an effective amount of an acidic aluminum salt solution at a pH of about 2.5 to 7 with a monodispersed silica sol having an average particle size from about 100 to about 500 Angstroms: (b) adding to and further blending with the blend of (a) above, an effective amount of a basic solution to raise the pH of the resulting blend to about 3 to 9; and (c) drying the blend at a temperature from about 100 to about 140° C.

In preferred embodiments of the present invention, the acidic aluminum salt is selected from the group consisting of aluminum sulfate, aluminum nitrate, and aluminum chloride and the basic solution may contain aluminate ions in which the counterions are monovalent cations.

In other preferred embodiments of the present invention, the aluminate solution is a sodium or potassium aluminate solution.

It is also within the scope of the present invention to produce a fluid catalytic cracking catalyst by incorporating into the aluminosilicate matrix crystalline aluminosilicates such as zeolites, and in particular, faujasites.

BRIEF DESCRIPTION OF THE FIGURES

FIG. 12 are plots of pore size distributions for comparative catalysts containing 40 wt. % rare-earth-exchanged high silica faujasite.

Figure 1:
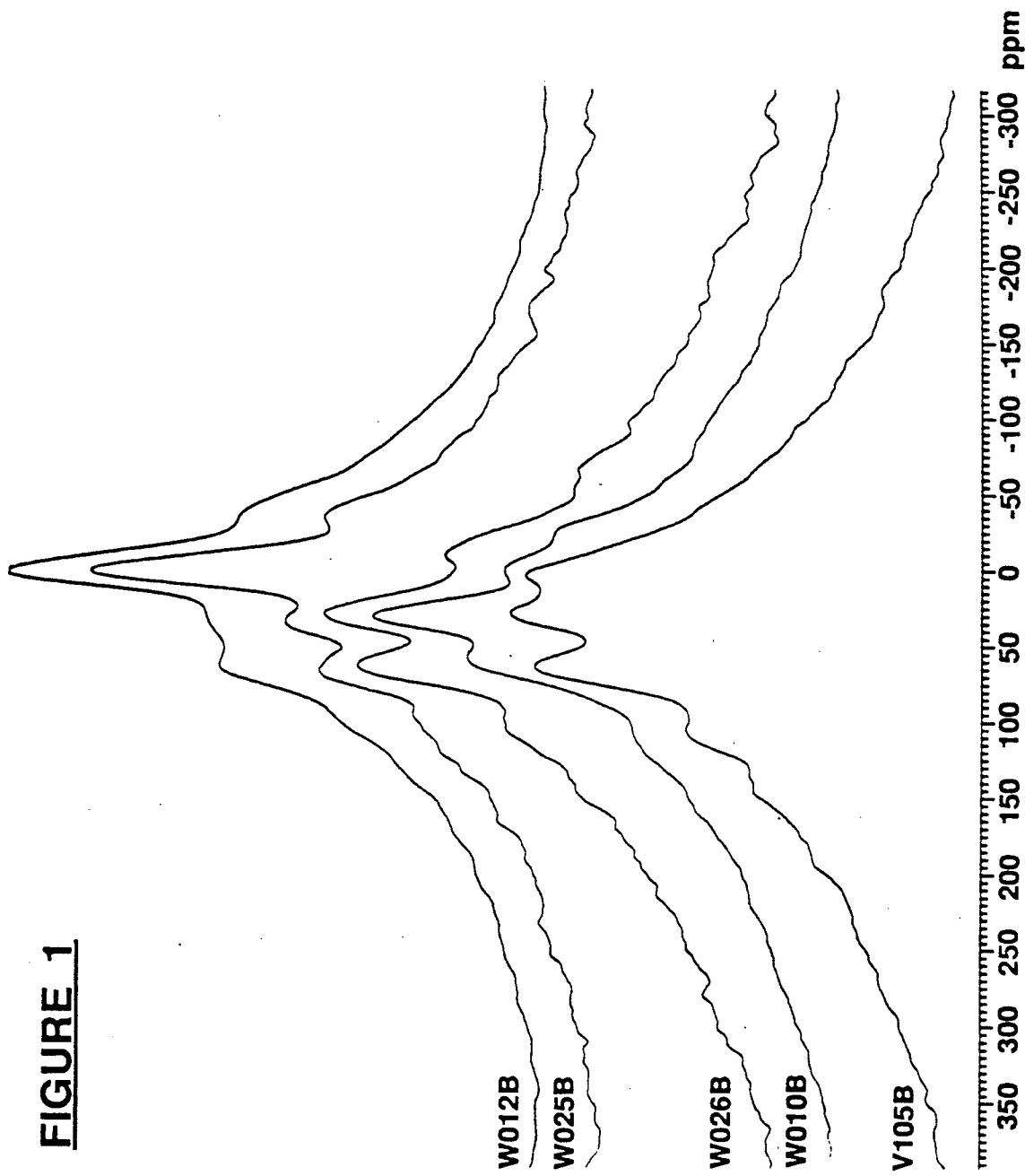
FIG. 1 are plots of $^{27}$Al MASNMR spectra for both matrices of this invention and comparative matrices.

All $^{27}$Al MASNMR spectra and pore size distributions were run after steaming the samples at 1400° F. for 16 hours.

DETAILED DESCRIPTION OF THE INVENTION

Silica sols suitable for use in the present invention are any of those which have a substantially uniform particle size within the range of about 20 to 400 Angstroms. The term, substantially uniform, as used herein with respect to the particle size means that at least 80%, preferably at least 90%, of the particles have a particle size from about 0.5D to 1.5D, where D is the median particle diameter. It is preferred that the silica sols used herein have spheroid particle shapes. The silica sols can be prepared by any conventional method in the art and examples can be found in "The Chemistry of Silica: Solubility, Polymerization, Colloid and Surface Properties, and Biochemistry" by Ralph K. Iler, John Wiley and Sons, New York, 1979.

Monodispersed silica sols are available commercially under such trade names as LUDOX and E. I. duPont de Nemours & Co., Inc., NALCOAG from Nalco Chemical Company, and NYACOL from PQ Corporation.

The monodispersed silica sol described above is blended with an aluminum salt solution of sufficient acidity to provide a pH from about 2.5 to 7, preferably a pH from about 2.5 to 5.5. Non-limiting examples of acidic aluminum salts suitable for use in the present invention include aluminum sulfate, aluminum nitrate, and aluminum chloride. Preferred is aluminum sulfate. An effective amount of basic solution is added to the blend to raise the pH to between about 3 and 9, preferably to between about 3.0 and 6.0. It is preferred that the basic solution be an aluminate solution, particularly sodium aluminate and potassium aluminate, more particularly sodium aluminate. The resulting blend is then dried at an effective temperature, that is a temperature which is high enough to "set" the structure but not so high as to occlude sodium within the structure and prevent it from being ionexchanged from the structure. Typically this temperature will be from about 80° to 220° C., preferably from about 100° to about 140° C.

The resulting monodispersed aluminosilicate matrix material of the present invention is characterized as having a pore size distribution such that most of the matrix porosity, as measured by mercury porosimetry, lies above about 100 Angstroms. The matrix materials of this invention have pore diameters between about 100 and 500 Angstroms, preferably between about 200 and 500 Angstroms, and more preferably between about 200 and 400 Angstroms. A maximum in a dV/dD plot lies above 150 Angstroms for matrices of this invention where dV is the incremental intrusion volume of the mercury in a porosimeter in cc/g and dD is the change in pore diameter. D (the diameter of the pore) is given by $(4 \gamma \cos \Theta)/p$ where $\gamma$ is the surface tension of mercury (474 dynes/cm), $\Theta$ is the assumed contact angle between mercury and the catalyst surface of 140° and p is the pressure. The materials of the present invention are further distinguished from prior art materials in that they do not have an enhanced 0 ppm $^{27}$Al MASNMR peak as is typically found in mesoporous amorphorous aluminosilicate matrix materials after steaming at 1400° F. for 16 hours. That is, there are substantially no microporous aluminum-containing species present. The 0 ppm $^{27}$Al MASNMR peak, after steaming at 1400° F. for 16 hours, is no more than 10% greater than any other peak. Preferably, the 0 ppm $^{27}$Al MASNMR peak is not the dominant peak. The substantial absence of this distinctive peak is attributed to the fact that the materials of this invention are prepared at a pH less than about 7, whereas similar prior art materials are prepared at a pH greater than about 7. The resulting catalyst compositions prepared with the matrix materials of the present invention are less susceptible to coking than catalysts prepared with matrices at a pH greater than about 7. $^{27}$Al MASNMR, or $^{27}$Al magic-angle spinning nuclear magnetic resonance, is a spectroscopic technique that is used herein to identify the coordination of aluminum in silica-aluminas.

If fluid catalytic cracking catalysts are to be prepared in accordance with the present invention, a crystalline aluminosilicate zeolite is added to the blend before drying. Zeolites which are suitable for use herein are the crystalline aluminosilicate materials having catalytic cracking activity. Such zeolite materials are described in U.S. Pat. Nos. 3,660,274 and 3,944,482, both of which are incorporated herein by reference. Non-limiting examples of such zeolites, which can be employed in the practice of this invention, include both natural and synthetic zeolites. These zeolites include zeolites of the structural types included in the "Atlas of Zeolite Structural Types" edited by W. M. Meier and D. H. Olson and published by the Structure Commission of the International Zeolite Association in 1978 and also included herein by reference. Preferred are the faujasites, more preferred are zeolites X and Y, which are faujasite-type zeolites, and most preferred is zeolite Y. The term faujasite-type, as used therein, means those zeolites isotructural to faujasite. It is preferred in the preparation of these catalysts that the zeolite be mixed with the matrix during blending.

The zeolite-containing catalysts of the present invention are prepared by blending the zeolite material with the acidic aluminum salt solution and monodispersed silica sol prior to the addition of the basic solution. The order in which the zeolite material is added in the first blending step is not important. That is, two of the ingredients (acidic aluminum salt, monodispersed silica sol and zeolite) can be first blended followed by further blending with the third ingredient or they can all be blended together at the same time.

Zeolites will typically have a silica to alumina mole ratios of at least about 3 and uniform pore diameters from about 4 to 15 Angstroms. Zeolites as produced or found in nature normally contain an alkali metal cation, such as sodium and/or potassium and/or an alkaline earth metal cation, such as magnesium and/or calcium. When used as a hydrocarbon cracking catalyst component, it is usually necessary to decrease the alkali metal content of the crystalline zeolite to less than about 10 wt. %, preferably less than about 6 wt. %, and more preferably less than about 1 wt. %. The alkali metal content reduction, as is known in the art, may be conducted by exchange with one or more cation selected from the Groups IB through VIII of the Periodic Table of Elements (Periodic Table of Elements referred to herein is given in *Handbook of Chemistry and Physics,* published by the Chemical Rubber Publishing Company, Cleveland, Ohio, 45th Edition, 1964), as well as with hydrogen cations or hydrogen precursors, e.g., $NH_4+$, capable of conversion to a hydrogen cation. Preferred cations include rare earths, calcium, magnesium, hydrogen and mixtures thereof. Ion exchange methods are well known in the art and are described, for example, in U.S. Pat. No. 3,140,249; U.S. Pat. No. 3,142,251 and U.S. Pat. No. 1,423,353, the teachings of which are hereby incorporated by reference. The concentration of the hydrogen cation in the finished catalyst is the difference between the theoretical exchange capacity of the particular zeolite and the number of equivalents of rare earths, alkaline earths, and alkali metals actually present. The particle size of the zeolite component may range from about 0.1 to 10 microns, preferably from 0.5 to 3 microns. Suitable amounts of zeolite component in the total catalyst will generally range from about 1 to about 60, preferably from about 1 to about 40, more preferably from about 5 to about 40 wt. % based on the total catalyst. Generally the particle size of the total catalyst when used in fluidized catalytic cracking operation will range from about 10 to about 300 microns in diameter, with an average particle diameter of about 60 microns.

The surface of area of the matrix material of this invention will be $\leq 150$ m$^2$/g, preferably $\leq 100$ m$^2$/g, more preferably from about 50 to 100 m$^2$/g. While the surface area of the final catalysts will be dependent on such things as type and amount of zeolitic material used, it will usually be less than about 300 m$^2$/g, preferably from about 50 to 300 m$^2$/g, more preferably from about 50 to 250 m$^2$/g, and most preferably from about 100 to 250 m$^2$/g.

Any conventional FCC process conditions may be used in the practice of the present invention. Typical catalytic cracking conditions include a temperature ranging from about 750° to 1300° F., a pressure ranging from about 0 to about 150 psig, typically from about 0 to about 45 psig. Suitable catalyst-to-oil weight ratios in the cracking zone used to convert the feed to lower boiling products are not more than about 20:1, and may range from about 20:1 to 2:1, preferably from 4:1 to 9:1. The catalytic cracking process may be carried out in a fixed bed, moving bed, ebullated bed, slurry, transferline (dispersed phase) or fluidized bed operation. Suitable regeneration temperatures include a temperature ranging from about 1100° to about 1500° F., and a pressure ranging from about 0 to about 150 psig. The oxidizing agent used to contact the partially deactivated (i.e., coked) catalyst will generally be an oxygen-containing gas such as air, oxygen and mixtures thereof. The partially deactivated (coked) catalyst is contacted with the oxidizing agent for a time sufficient to remove, by combustion, at least a portion of the carbonaceous deposit and thereby regenerate the catalyst in a conventional manner known in the art.

Suitable hydrocarbonaceous feeds for the catalytic cracking process of the present invention include naphtha, hydrocarbonaceous oils boiling in the range of about 430° F., to about 1050° F., such as gas oil; heavy hydrocarbonaceous oils comprising materials boiling above 1050° F.; heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes, and mixtures thereof.

The catalyst compositions of the present invention can be ionexchanged with an ammonium salt solution of a strong acid. Non-limiting examples of ammonium salts which can be used in solution in the practice of the present include ammonium sulfate, ammonium chloride, and ammonium nitrate.

The ion-exchange composition is than calcined at conventional temperatures and atmospheres and steamed in order to simulate the deactivation of cracking catalysts in commercial FCC units.

The instant invention is illustrated further by the following examples which, however, are not to be taken as limiting in any respect. All parts and percentages, unless expressly stated otherwise, are by weight.

The catalytic performance of catalysts of this invention were compared with catalysts prepared in accordance with the teachings of other patents and with commercial catalysts, using a modified microactivity test (MAT) with two standard feeds whose properties are outlined below. In this test, 2 cc of feed is injected over 5 gm of catalysts at a temperature of 482° C. over a period of 80 seconds. The conversion of feed to products which boil less than 220° C. is determined together with the coke and hydrogen yields. In order to allow a comparison between catalysts which produce different conversions, the coke yield and hydrogen yield are divided by a conversion function $(x/(1-x))$ in which x is the conversion from the 220° C.-fbp of the feed. These "normalized" coke and hydrogen yields are called the "specific coke" and the "specific hydrogen" respectively and allow comparison between catalysts of somewhat different activities.

| Feedstock | A | B |
|---|---|---|
| API Gravity (°) | 26.2 | 22.5 |
| Sulfur (Wt %) | — | 1.15 |
| Refractive Index | 1.4803 | 1.4928 |
| Aniline Point | 166 | 179 |
| Total Nitrogen (Wt %) | 0.057 | 0.063 |
| Pour Point, °F. | 65 | 95 |
| Hivac C, °C. 10/50/90 LV % | 329/374/419 | 400/456/519 |

Table I below shows results for the cracking of the preceding feeds over matrices used for this invention, over catalysts made using U.S. Pat. Nos. 4,217,240 and 4,272,409, and over catalysts made from conventional silica aluminas such as "3A" gels which are commercially available from the Davison Chemical Co., division of W. R. Grace.

These results show that the matrices used in this invention produce less coke at a given conversion level than catalysts prepared using U.S. Pat. Nos. 4,217,240 and 4,272,409. Further, though matrices of this invention have lower activities than conventional silica alumina catalysts, their specific coke yields are lower. Than matrices of this invention do not have a monodispersed pore size distribution in the substantial absence of zeolite; however, unlike conventional silica aluminas and materials prepared according to U.S. Pat. Nos. 4,217,240 and 4,272,409, the matrices of this invention have more than 20% of their pore volume as measured by mercury porosimetry in the 150-300 Angstrom pore diameter relative to that measured between 40 and 2000 Angstroms while other silica alumina matrices have substantially less than this concentration in this region.

TABLE I

Matrices used in This Invention Containing No Zeolite Additive

| Catalyst/ Feed | MAT Activity | Coke | Specific Coke | $H_2$ | Specific $H_2$ | 150-350 Angstrom/ 40-2000 Angstrom |
|---|---|---|---|---|---|---|
| W026B/A | 27.0 | 0.78 | 2.11 | .011 | .030 | 0.51 |
| W061B/A | 29.5 | 0.83 | 1.98 | .019 | .048 | 0.54 |
| W060B/A | 30.0 | 0.67 | 1.56 | .014 | .033 | 0.43 |
| W010B/A | 34.5 | 0.91 | 1.73 | .018 | .034 | 0.23 |
| W060B/B | 41.8 | 1.12 | 1.56 | .025 | .035 | 0.43 |
| W061B/B | 45.6 | 1.51 | 1.80 | .045 | .054 | 0.54 |

TABLE II

Catalysts Prepared According to U.S. Pat. Nos. 4,217,340 and 4,272,409 and Containing No Zeolite Additive

| Catalyst/ Feed | MAT Activity | Coke | Specific Coke | $H_2$ | Specific $H_2$ | 150-350 Angstrom/ 40-2000 Angstrom |
|---|---|---|---|---|---|---|
| W024B/A | 20.3 | 0.75 | 2.94 | .012 | .047 | 0.10 |
| W011B/A | 23.0 | 0.86 | 2.88 | .023 | .079 | 0.07 |
| W025B/A | 29.6 | 1.02 | 2.42 | .026 | .062 | 0.00 |
| W012B/A | 36.7 | 1.54 | 2.66 | .030 | .052 | 0.00 |
| W062B/A | 34.8 | 1.00 | 1.87 | .028 | .052 | 0.11 |
| W062B/B | 52.4 | 2.02 | 1.83 | .044 | .040 | 0.11 |

TABLE III

Catalysts Prepared from Commercial Silica Aluminas and Containing No Zeolite Additive

| Catalyst/ Feed | MAT Activity | Coke | Specific Coke | $H_2$ | Specific $H_2$ | 150-350 Angstrom/ 40-2000 Angstrom |
|---|---|---|---|---|---|---|
| V105B/A | 40.5 | 1.16 | 1.70 | .016 | .024 | 0.13 |
| W031B/A | 40.9 | 1.22 | 1.76 | .012 | .018 | 0.05 |

A further distinguishing feature of the matrices of this invention is the relatively low intensity of the 0 ppm peak in the $^{27}Al$ MASNMR (magic angle spinning nuclear magnetic resonance) of these materials. The presence of this peak attends the existence of Al in an octahedral form and the peak has been found by us to be significant whenever the silica aluminas are synthesized at a pH greater than 7. This is illustrated in FIG. 1 hereof in which the $^{27}Al$ MASNMR of two of the matrices of this invention and three of matrices not of this invention are shown. The matrices of this invention, as well as the standard silica-alumina catalyst, do not have a dominant 0 ppm $^{27}Al$ MASNMR peak. Matrices prepared in accordance with U.S. Pat. Nos. 4,217,240 and 4,272,409 do have a dominant 0 ppm $^{27}Al$ MASNMR peak. Thus matrices of this invention are characterized not only by a distinctive pore structure but also by the substantial absence of a 0 ppm peak in the $^{27}Al$ MASNMR. This 0 ppm peak is usually associated with octahedral Al and is thus not zeolitic in nature. It is probably associated with a microporous but non-zeolitic aluminum species since U.S. Pat. No. 3,310,441 teaches that silica-alumina gels made at a pH greater than 7 contain micropores (<40A) if the major source of alumina is derived from anionic alumina, in particular, from sodium aluminate. It is to be understood that in all instances hereof mention of the presence or absence of the $^{27}$Al MASNMR peak is based on measurement after steaming at 1400° F. for 16 hrs. at 70.339 megahertz, using a 3 microsecond pulse width corresponding to a 22° tip angle, and a 200 millisecond delay between pulses.

PREPARATION OF CATALYSTS

W010 (A Matrix of this Invention)

53 g of a commercial silica sol (DuPont Ludox HS-40) were added to a Waring blender. DuPont Ludox HS-40 is a sodium-stabilized 40 weight % silica sol solution with an average particle diameter of 12 nm and a specific surface area of 230 m$^2$/g. A solution of 23.5 g of aluminum sulfate pentadecahydrate (FW:612 g/mol) in 100 g of water was blended in this sol for 10 seconds (s). Finally, a solution of 10.1 g of sodium aluminate (55.3% Al$_2$O$_3$) in 100 g of water was added to the dispersion which thickened immediately. The resulting slurry was blended for five minutes. The pH of this slurry was 4.3. This slurry gelled so that it behaved as a solid mass in the drying dish and was dried in a forced draft oven at 80° C. for 72 hours(h). The dried cake was washed with 200 g of 100° C. water and dried at about 80° C. The dried cake was ground to a <40 mesh powder and then exchanged three times with 1000 g of a 5% ammonium sulfate solution for one hour at 100° C. The powder was washed three time with 1000 g of water at 100° C. for ½ h each time. The powder was then calcined at 550° C. for 2 h and then steamed at 1400° F. for 16 h. to give W010B.

| Analytical Results for W010B: | |
|---|---|
| Na (wt %) | 0.042 |
| SiO$_2$ (wt %) | 72.43 |
| Al$_2$O$_3$ (wt %) | 26.11 |
| BET Surface Area (m$^2$/g) | 71.2 |
| Nitrogen Pore Volume (cc/g) | 0.28 |

W026 (A Matrix of this Invention)

100 g of a commercial silica sol Ludox HS-40 was added to a Waring blender with 100 g of water and blended for 10 s. A solution of 24.7 g of aluminum sulfate pentadecahydrate (FW:612 g) in 200 g of water was added to this sol and the resultant dispersion was also blended for about 10 s.

Immediately thereafter, a solution of 10.6 g of sodium aluminate in 200 g of water was added to this dispersion and blended for 30 s. The pH of the resultant slurry was 4.3.

The slurry was dried in a small oven at 120° C. for 18 h and the resulting cake ground to a powder which passed a 40 mesh sieve.

The powder was exchanged three times with 1000 g of 5% ammonium sulfate solution at 100° C. for 1 hour. The powder was then washed three times with 1000 g of deionized water at 100° C. for 1 hour. The produce was then calcined at 550° C. for 2 hours and called W026A.

| Analytical Results for W026A: | |
|---|---|
| Na (wt %) | 0.12 |
| SiO$_2$ (wt %) | 85.35 |
| Al$_2$O$_3$ (wt %) | 15.61 |
| BET Surface Area (m$^2$/g) | 113 |
| Nitrogen Pore Volume (cc/g) | 0.43 |

W026A was then steamed in 1 atmosphere of steam at 1400° F. for 16 h to give W026B.

| Analytical Results for W026B: | |
|---|---|
| BET Surface Area (m$^2$/g) | 85 |
| Nitrogen Pore Volume (cc/g) | 0.42 |

W060 (A Matrix of this Invention)

212 g of a commercial silica sol Ludox HS-40 was added to a Waring blender. A solution of 94 g of aluminum sulfate octadecahydrate (FW:666 g) in 400 g of water was added to this sol and the resultant dispersion was blended for ca. 10 s.

Immediately thereafter, a solution of 40.4 g of sodium aluminate in 400 g of water was added to this dispersion and blended for 30 s. The pH of the resultant slurry was 4.2.

The slurry was dried in a forced draft oven at 90° C. for 72 h and the resulting cake was wet and ground to a powder which passed a 40 mesh sieve.

The powder was exchanged three times with 2000 g of 5% ammonium sulfate solution at 100° C. for 1 hour. The powder was then washed three times with 1000 g of deionized water at 100° C. for 1 hour. The product was then calcined at 550° C. for 2 hours and called W060A.

| Analytical Results for W060A: | |
|---|---|
| Na (wt %) | 0.044 |
| SiO$_2$ (wt %) | 74.45 |
| Al$_2$O$_3$ (wt %) | 24.45 |
| BET Surface Area (m$^2$/g) | 99.5 |
| Nitrogen Pore Volume (cc/g) | 0.27 |

W060A was then steamed in 1 atmosphere of stem at 1400° C. for 16 h to give W060B.

| Analytical Results for W060B: | |
|---|---|
| BET Surface Area (m$^2$/g) | 59 |
| Nitrogen Pore Volume (cc/g) | 0.31 |

W061 (A Matrix of this Invention)

225 g of Ludox HS-40 was added to a Waring blender. A solution of 18 g of aluminum sulfate octadecahydrate (FW:666 g) in 200 g of water was added to this sol and the resultant dispersion was blended for ca. 10 s.

Immediately thereafter, a solution of 12.5 g of sodium aluminate (55.7% Al$_2$O$_3$) in 200 g of water was added to this dispersion and blended for 5 minutes. The pH of the resultant slurry was 7.3.

The slurry was dried in a forced draft oven at 100° C. for 16 h. and the resulting cake was ground to a powder which passed a 40 mesh sieve.

The powder was exchanged three times with 2000 g of 5% ammonium sulfate solution at 100° C. for 1 hour. The powder was then washed three (3) times with 1000 g of deionized water at 100° C. for 1 hour. The product was then calcined at 550° C. for 2 hours and called W061A.

| Analytical Results for W061A: | |
|---|---|
| Na (wt %) | 0.049 |
| SiO$_2$ (wt %) | 89.89 |
| Al$_2$O$_3$ (wt %) | 8.19 |
| BET Surface Area (m$^2$/g) | 186 |
| Nitrogen Pore Volume (cc/g) | 0.72 |

W061A was then steamed in 1 atmosphere of steam at 1400° f. FOR 16 h to give W061B.

| Analytical Results for W061B: | |
|---|---|
| BET Surface Area (m$^2$/g) | 141.2 |
| Nitrogen Pore Volume (cc/g) | 0.68 |

W012 (Prepared in Accordance with U.S. Pat. Nos. 4,217,240 and 4,272,409)

53 g of Ludox HS-40 in a Waring blender with 200 g of deionized water. To this was added a solution of 17.2 g of sodium aluminate (55.3% Al$_2$O$_3$) in 200 g of water. The dispersion thickened immediately. The resultant slurry was blended for five minutes. The pH of this slurry was 11.7 The slurry was dried in a forced draft oven at 80° C. for 72 h and remained as a free flowing liquid as it dried. The dried cake was ground to a <40 mesh powder and then exchanged five times with 1000 g of a 5% ammonium sulfate solution at 100° C. for 1 hour. The powder was washed three times with 1000 g of water at 100° C. for ½ h. and then calcined at 550° C. for 2 h. The powder was then steamed at 1400° F. for 16 h to give W012B.

| Analytical Results for W012B: | |
|---|---|
| Na (wt %) | 0.057 |
| SiO$_2$ (wt %) | 71.64 |
| Al$_2$O$_3$ (wt %) | 26.25 |
| BET Surface Area (m$^2$/g) | 118 |
| Nitrogen Pore Volume | 0.54 |

W025 (Prepared in Accordance with U.S. Pat. Nos. 4,217,240 and 4,272,409)

100 g of Ludox HS-40 were blended with 200 g of water in a Waring blender for 10 seconds.

A solution of 18.1 g of sodium aluminate in 200 g of water was added to this sol and blended for ca. 30 s. The pH of the resulting material on addition and blending was 11.6.

The slurry was dried in a forced draft oven at 120° C. for 18 hours. The cake was then ground to pass a 40 mesh sieve and then exchanged five times with 1000 g of 5% ammonium sulfate solution at 100° C. for 1 hour.

The exchanged powder was washed three (3) times with 1000 g of deionized water at 100° C. for 1 hour and then calcined at 550° C. for 2 hours. The ground, exchanged, washed and calcined product was called W025A.

| Analytical Results for W025A: | |
|---|---|
| Na (wt %) | 0.11 |
| SiO$_2$ (wt %) | 86.30 |
| Al$_2$O$_3$ (wt %) | 13.56 |
| BET Surface Area (m$^2$/g) | 146 |
| Nitrogen Pore Volume (cc/g) | 0.76 |

W025A was then steamed in 1 atmosphere of steam at 1400° F. for 16 h to give W025B.

| Analytical Results for W025B: | |
|---|---|
| BET Surface Area (m$^2$/g) | 97 |
| Nitrogen Pore Volume (cc/g) | 0.63 |

W062 (Prepared in Accordance with U.S. Pat. Nos. 4,217,240 and 4,272,409)

212 g of Ludox HS-40 was blended with 400 g of water in a Waring blender. Then a solution of 65.2 g of sodium aluminate (55.7% Al$_2$O$_3$) in 400 g of water was added to this dispersion and blended for 5 minutes. The pH of the resultant slurry was 11.9.

The slurry was dried in a forced draft oven at 90° C. for 16 h. and the resulting cake was ground to a powder which passed a 40 mesh sieve.

The powder was exchanged five times with 2000 g of 5% ammonium sulfate solution at 100° C. for 1 hour. The powder was then washed three times with 1000 g of deionized water at 100° C. for ½ hour. The product was then calcined at 550° C. for 2 hours and called W062A.

| Analytical Results for W062A: | |
|---|---|
| Na (wt %) | 0.041 |
| SiO$_2$ (wt %) | 77.64 |
| Al$_2$O$_3$ (wt %) | 21.24 |
| BET Surface Area (m$^2$/g) | 93 |
| Nitrogen Pore Volume (cc/g) | 0.45 |

W062A was then steamed in 1 atmosphere of steam at 1400° F. for 16 h to give W062B.

| Analytical Results for W062B: | |
|---|---|
| BET Surface Area (m$^2$/g) | 77 |
| Nitrogen Pore Volume (cc/g) | 0.43 |

W031: Standard Silica-alumina Catalyst Preparation 500 g of 3A gel (Davison Chemical; 87.07% off at 520° C. 12.67% solids; pH=7) was dried in a forced draft oven at 120° C. for 18 hours. The dried cake was then ground to pass a #32 screen. The resulting powder was exchanged three times with 1000 g of 5% ammonium sulfate solution at 100° C. for 1 hour.

The powder was then washed three times with 1000 g of deionized water at 100° C. for 1 hour and calcined at 550° C. for 2 hours. The ground, exchanged, washed and calcined product was called W031A.

| Analytical Results for W031A: | |
|---|---|
| Na (wt %) | 0.0314 |
| SiO$_2$ (wt %) | 81.35 |
| Al$_2$O$_3$ (wt %) | 17.30 |
| BET Surface Area (m$^2$/g) | 398 |
| Nitrogen Pore Volume (cc/g) | 0.66 |

W031A was then steamed in 1 atmosphere of steam at 1400° F. for 16 h to give W031B.

| Analytical Results for W031B: | |
|---|---|
| BET Surface Area (m²/g) | 155 |
| Nitrogen Pore Volume (cc/g) | 0.46 |

V105: Standard Silica-alumina Catalyst 25 g of 3A catalyst (an item of commerce supplied by Davison Chemical, Division of W. R. Grace Co.) was steamed in 1 atmosphere of steam at 1400° C. for 16 h to give V105B.

| Analytical Results for V105B: | |
|---|---|
| BET Surface Area (m²/g) | 136 |
| Nitrogen Pore Volume (cc/g) | 0.46 |

Catalysts of this Invention Containing Zeolites

Since the matrices of this invention when dried do not show a sharp pore size distribution, it is significant that matrices of this invention when used in conjunction with zeolites have sharp pore size distributions. In particular, the zeolite-containing catalysts of this invention have pore size distributions as measured by mercury porisimetry such that the pore size distribution about the maximum in the dV/dR plot occurs with a peak width at half maximum of +/−35% of the pore diameter at the maximum. Further the pore size distributions of catalysts of this invention are such that the maximum in the dV/dR plot occurs between 150 and 500 Angstroms.

TABLE IV

Catalysts of this Invention Containing 20% Ultrastable Y Zeolite

| Catalyst/Feed | MAT Activity | Coke | Specific Coke | $H_2$ | Specific $H_2$ |
|---|---|---|---|---|---|
| V098B/A | 56.7 | 1.03 | 0.79 | .014 | .0107 |
| V111B/A | 57.8 | 1.08 | 0.79 | .016 | .0113 |
| V116B/A | 57.0 | 1.04 | 0.78 | .020 | .0157 |
| W034B/A | 57.9 (1) | 1.16 | 0.84 | .023 | .0164 |
| W035B/A | 55.2 (2) | 1.18 | 0.96 | .012 | .0100 |

(1) This catalyst was prepared at a pH of 7 and as such just lies outside of this invention.
(2) This catalyst has been prepared in a similar fashion to the catalysts of this invention; however it does not have the pore structure of catalysts of this invention and as such lies outside of this invention.

TABLE V

Catalysts Prepared According to U.S. Pat. Nos. 4,217,240 and 4,272,409 and Containing 20% Ultrastable Y Zeolite

| Catalyst/Feed | MAT Activity | Coke | Specific Coke | $H_2$ | Specific $H_2$ |
|---|---|---|---|---|---|
| V069A/A | 55.4 | 1.41 | 1.13 | .062 | .050 |
| V096B/A | 58.6 | 1.44 | 1.02 | .032 | .022 |
| W019B/A | 52.0 | 1.31 | 1.21 | .022 | .020 |
| W032B/A | 51.8 | 1.34 | 1.25 | .020 | .019 |

TABLE VI

Catalysts Prepared with Commercial Silica Alumina Gels and Containing 20% Ultrastable Y Zeolite

| Catalyst/Feed | MAT Activity | Coke | Specific Coke | $H_2$ | Specific $H_2$ |
|---|---|---|---|---|---|
| W029B/A | 57.7 | 1.28 | 0.94 | .019 | .014 |
| W044B/A | 59.2 | 1.48 | 1.02 | .026 | .018 |
| W046B/A | 57.2 | 1.45 | 1.08 | .028 | .021 |
| W053B/A | 58.4 | 1.38 | 0.98 | .036 | .025 |
| W053B/B | 69.0 | 2.81 | 1.26 | .043 | .020 |
| W055B/A | 54.9 | 1.20 | 0.99 | .023 | .019 |
| W055B/B | 66.9 | 2.08 | 1.03 | .029 | .014 |

Figure 2:
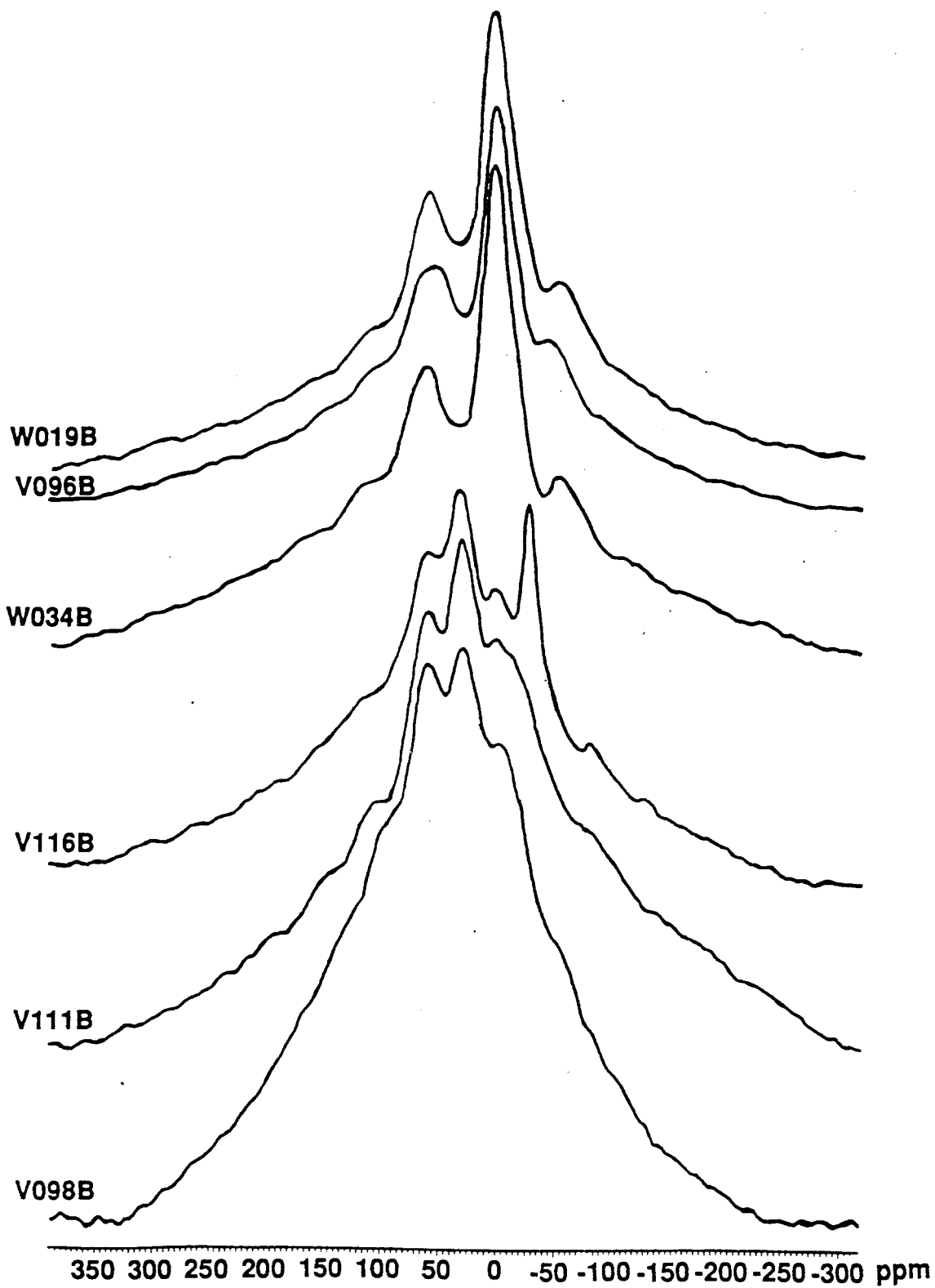
FIG. 2 are plots of $^{27}$Al MASNMR spectra for catalysts of this invention and comparative catalysts, all containing 20 wt. % ultrastable Y zeolite.

A further distinguishing feature of the catalysts of this invention is the relatively low intensity of the 0 ppm peak in the $^{27}Al$ MASNMR (magic angle spinning nuclear magnetic resonance) of catalysts prepared with ultrastable Y zeolite and the matrices of this invention. The presence of this peak attends the existence of Al in an octahedral form and the peak has been found by us to be significant whenever the silica aluminas are synthesized at a pH greater than 7. Significantly, the 0 ppm $^{27}Al$ MASNMR peak does not dominate the spectrum of steamed catalysts prepared with the matrices of this invention and ultrastable Y as long as the synthesis pH is less than 7. This is illustrated in FIG. 2 in which the $^{27}Al$ MASNMR of four of the catalysts of this invention and one of a catalyst not of this invention are shown. Catalysts of this invention, that is, catalysts prepared from zeolites and matrices of this invention and which have a pore size distribution such that a maximum in dV/dR lies above 140 Angstroms will not have a dominant 0 ppm $^{27}Al$ MASNMR peak as long as they are prepared at a pH <7 and do not have components which produce octahedral Al on steaming.

PREPARATION OF CATALYSTS CONTAINING 20% USY

V098 (20% USY Catalyst Prepared with Matrix of this Invention)

15.4 g of LZY-82, an ultrastable faujasite (Union Carbide), was dispersed in 50 g of water with a Waring blender. To this dispersion was added a solution of 25.4 g of aluminum sulfate hydrate in 200 g of water and this was blended for ca.10 s. The pH of the resulting dispersion was 3.0. 100.0 g of Ludox HS-40 was then added and blended for 10 seconds giving a pH of 3.2. Finally a solution of 11.5 g of sodium aluminate in 100 g of water was added to the dispersing which thickened immediately. This gel was blended for 30 s. The pH of the gel was 4.5. The gel was dried to a cake at 120° C. for 18 hours. The cake was then ground to <0.125" pieces and dried an additional 2 h at 250° C. The powder was exchanged twice with 220 g of 5% ammonium sulfate solution at 75° C. for 1 hour on a shaker bath. Then it was washed with 200 g of water at 75° C. and exchanged again with 500 g of 5% ammonium sulfate solution at 100° C. for 1 hour on a shaker bath. Finally it was washed twice with 500 g of water at 100° C. for ½ h and calcined at 550° C. for 1 h. The powder was then steamed at 1400° C. for 16 h to give V098B.

| Analytical Results for V098B: | |
|---|---|
| Na (ppm) | 489 |
| $SiO_2$ (wt %) | 80.75 |
| $Al_2O_3$ (wt %) | 18.00 |
| BET Surface Area (m²/g) | 144 |
| Nitrogen Pore Volume (cc/g) | 0.42 |
| Unit Cell (Angstroms) | 24.18 |

| -continued |  |
|---|---|
| Analytical Results for V098B: | |
| Zeolite Crystallinity (Xtallinity) | 14 |

V111 (20% USY Catalyst Prepared with Matrix of this Invention)

15.4 g of LZY-82 was dispersed in 60 g of water with a Waring blender. To this dispersion was added a solution of 25.4 g of aluminum sulfate octadecahydrate (FW:666 g/mol) in 200 g of water followed by 100 g of Ludox HS-40. Finally a solution of 11.5 g of sodium aluminate (55.3% $Al_2O_3$) in 100 g of water was added to the dispersion and the resultant gel was blended an additional minute. The gel was dried in a small oven at 120° C. for 72 h to form a dried cake which was ground to a <40 mesh powder. The powder was exchanged with 600 g of a 5% ammonium sulfate solution three times at 100° C. for 1 hour each. The powder was washed 3× with 500 g of water at 100° C. and then calcined at 550° C. for 2 h. It was then steamed at 1400° F. for 16 h to give V111B.

| Analytical Results: | |
|---|---|
| Na (wt %) | 0.0739 |
| BET Surface Area (m²/g) | 135 |
| Nitrogen Pore Volume (cc/g) | 0.42 |
| Unit Cell (Angstroms) | 24.16 |
| Zeolite Xtallinity | 30 |

V116 (20% USY Catalyst Prepared with Matrix of this Invention)

15.4 g of LXY-82 was dispersed in 150 g of water with a Waring blender. To this dispersion was added a solution of 25.4 g of aluminum sulfate octadecahydrate (FW:666 g/mol) in 100 g of water followed by 100 g of Ludox HS-40. Finally a solution of 11.5 g of sodium aluminate (55.3% $Al_2O_3$) in 100 g of water was added to the dispersion and the resultant gel was blended an additional minute. The gel was dried at 120° C. for 16 h and then at 250° C. for an additional 16 h and then ground to a <40 mesh powder. The powder was exchanged with 500 g of a 5% ammonium sulfate solution three times at 100° C. for 1 hour each. The powder was washed 3× with 500 g of water at 100° C. and then calcined at 550° C. for 2 h to give V116A.

| Analytical Results for V116A: | |
|---|---|
| Na (wt %) | 0.067 |
| BET Surface Area (m²/g) | 178 |
| Nitrogen Pore Volume (cc/g) | 0.41 |
| Unit Cell (Angstroms) | 24.43 |
| Zeolite Xtallinity | 20 |

V116A was then steamed at 1400° F. for 16 h to give V116B.

| Analytical Results for V116B: | |
|---|---|
| Na (wt %) | 0.067 |
| BET Surface Area (m²/g) | 153 |
| Nitrogen Pore Volume (cc/g) | 0.45 |
| Unit Cell (Angstroms) | 24.20 |

| -continued |  |
|---|---|
| Analytical Results for V116B: | |
| Zeolite Xtallinity | 16 |

Figure 3:
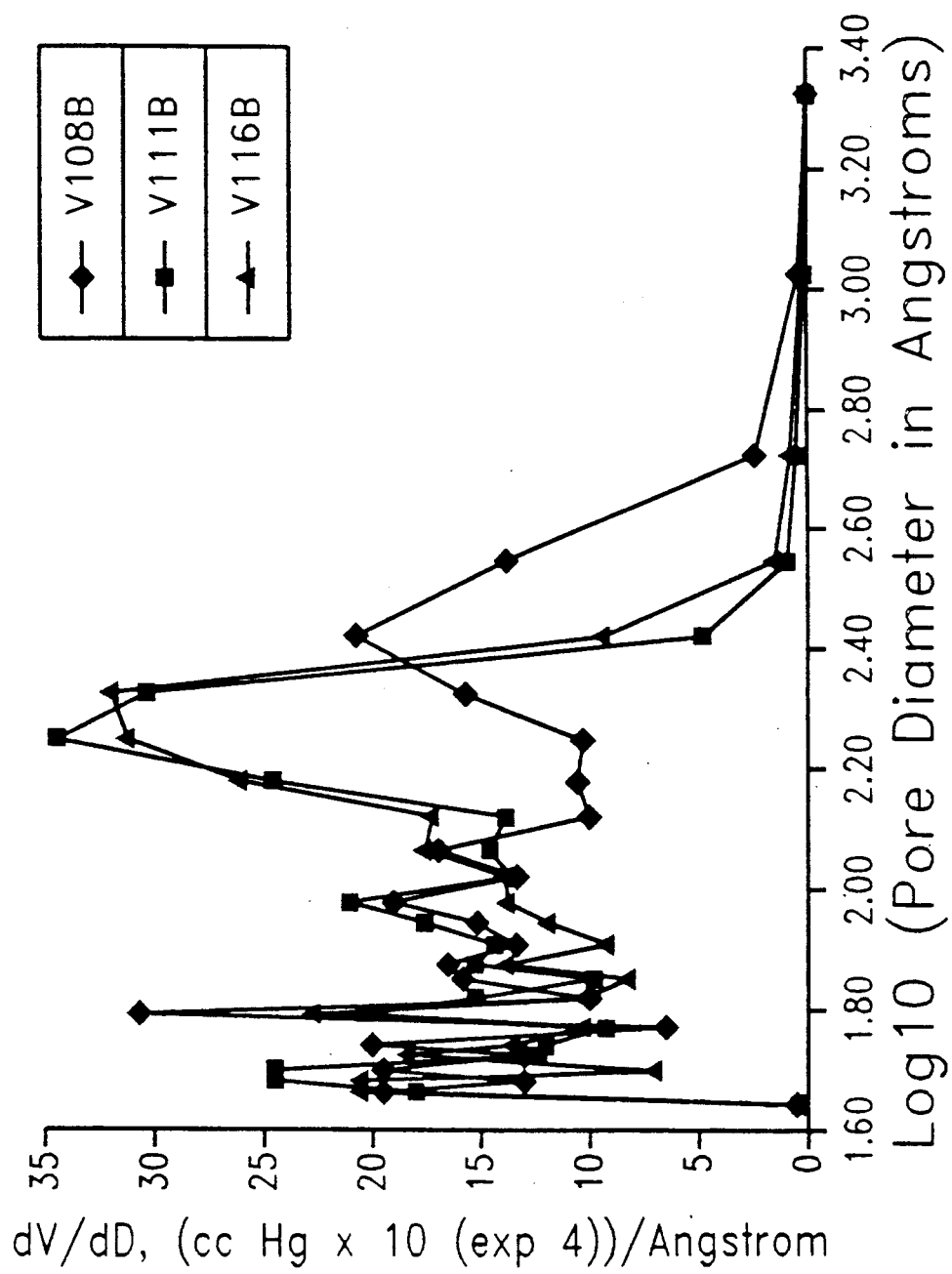
FIG. 3 are plots of pore size distributions for catalysts of this invention containing 20 wt. % ultrastable Y zeolite.

A plot of pre size distribution for catalysts V098B, V111B, and V116B is shown in FIG. 3 hereof.

W034 (20% USY Catalyst Prepared at the pH Border of Catalysts of this Invention)

20.8 g of LZY-82 was dispersed in 200 g of deionized water with a Waring blender to give a pH of 6.5. A solution of 13 g of aluminum sulfate pentadecahydrate (F.W. 612 g) in 200 g of water was blended with this dispersion for 60 min to give a pH of 3.4. The preceding suspension was blended with 120 g of Ludox HS-40 for 10 seconds to give a pH of 3.5. Finally a solution of 9.8 g of sodium aluminate in 100 g of water was blended into the mixture to give a pH of 7.3.

The semigel was dried at 120° C. for 42 h and then ground to a <40 mesh powder.

The powder was exchanged with 1000 g of a 5% ammonium sulfate solution three times at 100° C. for 1 hour each. The powder was washed three times with 1000 g of water at 100° C. and then calcined at 550° C. for 2 h to give W034A:

| Analytical Results for W034A: | |
|---|---|
| Na (wt %) | 0.13 |
| BET Surface Area (m²/g) | 293 |
| Nitrogen Pore Volume (cc/g) | 0.56 |
| Unit Cell (Angstroms) | 24.48 |
| Zeolite Xtallinity | 26 |

W034A was then steamed at 1400° F. for 16 h to give W034B.

| Analytical Results for W034B: | |
|---|---|
| MAT (FS-5078) in duplicate | 57.9/0.0226/1.16 |
| BET Surface Area (m²/g) | 225 |
| Nitrogen Pore Volume (cc/g) | 0.55 |
| Unit Cell (Angstroms) | 24.25 |
| Zeolite Xtallinity | 39 |

W035— (This preparation demonstrates that even if the preparation is similar to that of the catalysts of this invention but does not produce large mesopores, then the coke yield is not lowered)

20.8 g of LXY-82 was dispersed in 200 g of deionized water with a Waring blender. To this dispersion was added a solution of 13 g of aluminum sulfate pentadecahydrate (FW:612 g/mol) in 200 g of water followed by 120 g of Ludox HS-40 to give a dispersion with a pH of 3.5. This dispersion was blended with a solution of 455 g of sodium aluminate in 40 g of water for 60 s to give a slurry with a pH of 4.2.

The slurry was dried at 111° C. for 18 hours and then ground to a <32 mesh powder.

The powder was exchanged with 1000 g of a 5% ammonium sulfate solution three times at 100° C. for 1 hour each. The powder was washed three times with 1000 g of water at 100° C. and then calcined at 550° C. for 2 h to give W035A:

| Analytical Results for W035A: | |
| --- | --- |
| Na (wt %) | 0.11 |
| BET Surface Area (m²/g) | 259 |
| Nitrogen Pore Volume (cc/g) | 0.49 |
| Unit Cell (Angstroms) | 24.48 |
| Zeolite Xtallinity | 23 |

W035A was then steamed at 1400° F. for 16 h to give W035B.

| Analytical Results for W035B: | |
| --- | --- |
| BET Surface Area (m²/g) | 188 |
| Nitrogen Pore Volume (cc/g) | 0.46 |
| Unit Cell (Angstroms) | 24.20 |
| Zeolite Xtallinity | 31 |

EXAMPLES NOT OF THIS PROPOSED INVENTION CONTAINING 20% USY PREPARED ACCORDING TO U.S. PAT. NOS. 4,217,240 AND 4,272,409

V069: 20% USY Counterexample Whose Matrix was Prepared According to U.S. Pat. Nos. 4,217,240 and 4,272,409

15.4 g of LZY-82 was dispersed in 50 g of water with a Waring blender. To this dispersion was added a solution of 16.9 g of aluminum sulfate hydrate in 200 g of water and blended for ca. 5 seconds. The pH of the resulting dispersion was 3.0. 99.2 g Ludox HS-40 was then added and and blended for 10 seconds. Finally, a solution of 13.9 g of sodium aluminate in 100 g of water was added and the dispersion thickened immediately. This gel was blended for an additional minute and had a final pH of 8.4. The slurry was dried at 120° C. for 72 h. The resulting powder was ground and exchanged twice with 250 g of 5% ammonium sulfate solution at 65° C. for 1 hour on a shaker bath. Then the powder was washed twice with 200 g of water at 75° C. and calcined at 550° C. for 1 h. The powder was then steamed at 1400° F. for 16 h to give V069A.

| Analytical Results for 86WA069A: | |
| --- | --- |
| Na (wt %) | 0.30 |
| BET Surface Area (m²/g) | 199 |
| Nitrogen Pore Volume (cc/g) | 0.50 |

V096: 20% USY Counterexample Whose Matrix was Prepared According to U.S. Pat. Nos. 4,217,240 and 4,272,409

15.4 g of LZY-82 was blended with 50 g of water with a Waring blender. A solution of 16.9 g of aluminum sulfate hydrate in 200 g of water was blended into this dispersion for ca. 10 s. The pH of the resulting dispersion was 3.2. Then 100.0 g of Ludox HS-40 was added and blended for 10 seconds. The pH of the resulting dispersion was 3.2. Finally a solution of 13.8 g of sodium aluminate in 100 g of water was added to the dispersion which thickened immediately. The thickened slurry was blended for 1 minute. The pH of the slurry was 8.4. The slurry was than dried in a small oven at 120° C. for 18 hours. The cake was then ground to <0.125" pieces and dried an additional 2 h at 250° C. The ground cake was exchanged twice with 220 g of 5% ammonium sulfate solution at 75° C. for 1 hour on a shaker bath. It was then washed the powder with 200 g of water at 75° C. and exchanged with 500 g of 5% ammonium sulfate solution at 100° C. for 1 hour on a stirring hot plate. The powder was washed twice with 500 g of water at 100° C. for ½ h and the calcined at 550° C. for 1 h. The powder was then steamed at 1400° F. for 16 h to give V096B.

| Analytical Results for V096: | |
| --- | --- |
| Na (ppm) | 524 |
| SiO₂ (wt %) | 8.47 |
| Al₂O₃ (wt %) | 18.91 |
| BET Surface Area (m²/g) | 193 |
| Nitrogen Pore Volume (cc/g) | 0.48 |
| Unit Cell (Angstroms) | 24.23 |
| Zeolite Xtallinity | 19 |

W019: 20% USY counterexample whose matrix was prepared according to U.S. Pat. Nos. 4,217,240 and 4,272,409 This catalysts is a particularly good example of the fact that catalysts made with a sharp pore size distribution in a basic regime do not perform as well as catalysts of this invention.

20.8 g of LZY-82 was dispersed in 200 g of deionized water with a Waring blender. 120 g of Ludox HS-40 was blended with this dispersion for ca. 10 s to give a dispersion with a pH of 8.2.

This dispersion was blended with a solution of 21.7 g of sodium aluminate in 200 g of water for 60 s to give a slurry with a pH of 8.4.

The slurry was dried at 111° C. for 18 hours and then ground to a <40 mesh powder.

The powder was exchanged with 1000 g of a 5% ammonium sulfate solution three times at 100° C. for 1 hour each. The powder was washed three times with 1000 g of water at 100° C. and then calcined at 500° C. for 2 h to give W0.19A:

| Analytical Results for W019A: | |
| --- | --- |
| Na (wt %) | 0.13 |
| BET Surface Area (m²/g) | 232 |
| Nitrogen Pore Volume (cc/g) | 0.58 |
| Unit Cell (Angstroms) | 24.55 |
| Zeolite Xtallinity | 17 |

W019A was then steamed at 1400° F. for 16 h to give W019B.

| Analytical Results for W019B: | |
| --- | --- |
| BET Surface Area (m²/g) | 150 |
| Nitrogen Pore Volume (cc/g) | 0.61 |
| Unit Cell (Angstroms) | 24.24 |
| Zeolite Xtallinity | 10 |

W032: 20% USY Counterexample Whose Matrix was Prepared According to U.S. Pat. Nos. 4,217,240 and 4,272,409

20.8 g of LZY-82 was dispersed in 200 g of deionized water with a Waring blender. This dispersion was blended with a solution of 13.0 g of sodium aluminate in 200 g of water for 60 s to give a slurry with a pH of 11.1

120 g of Ludox HS-40 was blended with this dispersion for ca. 10 s to give a slurry with a pH of 11.4

The slurry was dried at 111° C. for 42 hours and then ground to a <32 mesh powder.

The powder was exchanged with 1000 g of a 5% ammonium sulfate solution three times at 100° C. for 1 hour each. The powder was washed three times with 1000 g of water at 100° C. and then calcined at 550° C. for 2 h to give W032A:

| Analytical Results for W032A: | |
| --- | --- |
| Na (wt %) | 0.11 |
| BET Surface Area (m$^2$/g) | 266 |
| Nitrogen Pore Volume (cc/g) | 0.50 |
| Unit Cell (Angstroms) | 24.54 |
| Zeolite Xtallinity | 17 |

W032A was then steamed at 1400° F. for 16 h to give W032B.

| | |
| --- | --- |
| BET Surface Area (m$^2$/g) | 204 |
| Nitrogen Pore Volume (cc/g) | 0.46 |
| Unit Cell (Angstroms) | 24.20 |
| Zeolite Xtallinity | 35 |

Figure 4:
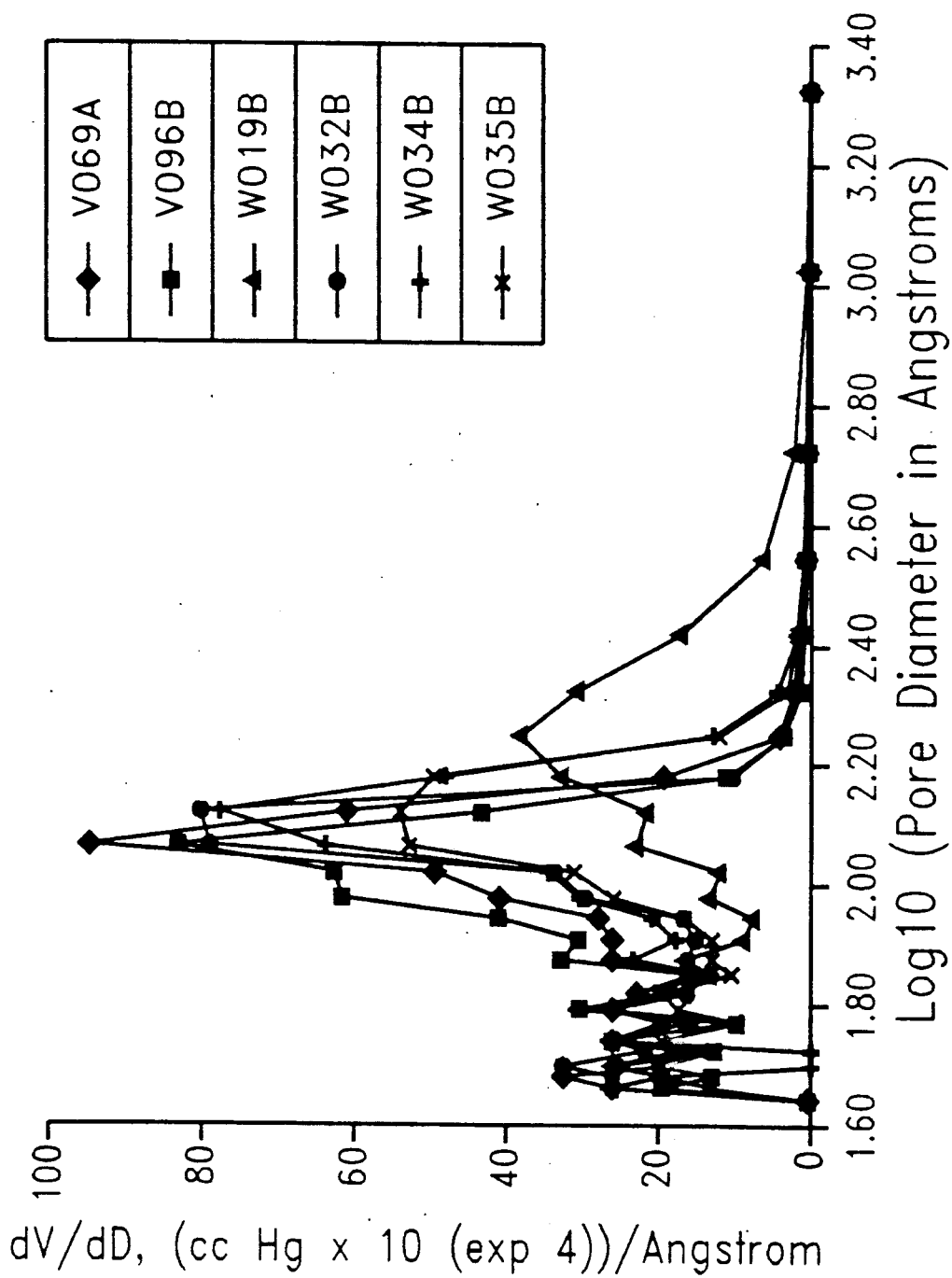
FIG. 4 are plots of pore size distributions for comparative catalysts containing 20 wt. % ultrastable Y zeolite.

A plot of pore size distribution for catalysts V069A, V096B, W019B, W032B, W034B, and W035B is found in FIG. 4 hereof.

EXAMPLES NOT OF THIS PROPOSED INVENTION CONTAINING 20% USY PREPARED WITH COMMERCIAL SILICA-ALUMINA GEL

W029: 20% USY Counterexample Using 3A Gel 13.9 g of was dispersed in 100 g of deionized water with a Waring blender.

400 g of 3A gel (87.07% off at 520° C.; 12.67% solids assume 10% catalytic solids) was dispersed and blended with the zeolite for 5 minutes to give a slurry with a pH of 7.2.

The slurry was dried in a forced draft oven at 120° C. for 18 hours and then ground to a <32 mesh powder. The powder was exchanged with 1000 g of a 5% ammonium sulfate solution three times at 100° C. for 1 hours each. The powder was washed three times with 1000 g of water at 100° C. and then calcined at 550° C. for 2 h to give W029A:

| Analytical Results for W029A: | |
| --- | --- |
| Na (wt %) | 0.0740 |
| SiO$_2$ (wt %) | 80.23 |
| Al$_2$O$_3$ (wt %) | 18.19 |
| BET Surface Area (m$^2$/g) | 454 |
| Nitrogen Pore Volume (cc/g) | 0.66 |
| Unit Cell (Angstroms) | 24.48 |
| Zeolite Xtallinity | 24 |

W029A was then steamed at 1400° F. for 16 h to give W029B.

| Analytical Results for W029B: | |
| --- | --- |
| BET Surface Area (m$^2$/g) | 229 |
| Nitrogen Pore Volume (cc/g) | 0.52 |
| Unit Cell (Angstroms) | 24.23 |
| Zeolite Xtallinity | 35 |

W044: 20% USY Counterexample Using 3A Gel 10.0 g of which had been previously calcined at 650° C. for two hours was dispersed in 100 g of deionized water with a Waring blender to give a dispersion with a pH of 4.7.

400 g of 3A gel (87.7% off at 520° C.; 12.67% solids assume 10% catalytic solids) was dispersed and blended with the zeolite for 5 minutes to give a slurry with a pH of 6.8.

The slurry was dried in a forced draft oven at 90° C. for 18 hours and then ground to a <32 mesh powder. The powder was exchanged with 1000 g of a 5% ammonium sulfate solution three times at 100° C. for 1 hour each. The powder was washed three times with 1000 g of water at 100° C. and the calcined at 550° C. for 2 h to give W044A:

| Analytical Results for W044A: | |
| --- | --- |
| Na (wt %) | 0.02 |
| SiO$_2$ (wt %) | 81.76 |
| Al$_2$O$_3$ (wt %) | 18.27 |
| BET Surface Area (m$^2$/g) | 412 |
| Nitrogen Pore Volume (cc/g) | 0.64 |
| Unit Cell (Angstroms) | 24.49 |
| Zeolite Xtallinity | 23 |

W044A was then steamed at 1400° C. for 16 h to give W044B.

| Analytical Results for W044B: | |
| --- | --- |
| BET Surface Area (m$^2$/g) | 219 |
| Nitrogen Pore Volume (cc/g) | 0.51 |
| Unit Cell (Angstroms) | 24.27 |
| Zeolite Xtallinity | 76% |

W046: 20% USY Counterexample Using 3A Gel 10.0 g of LZY-82 which had been previously calcined at 650° C. for two hours was dispersed in 100 g of deionized water with a Waring blender to give a dispersion with a pH of 4.7 which dropped after 5 minutes to 3.6.

400 g of 3A gel (87.07% off at 520° C.; 12.67% solids assume 10% catalytic solids) was dispersed and blended with the zeolite dispersion and the pH was adjusted to 4.0 by the addition of 21.5 g of 10 weight % concentrated sulfuric acid.

The slurry was dried in a forced draft oven at 90° C. for 18 hours and then ground to a <32 mesh powder. The powder was exchanged with 1000 g of a 5% ammonium sulfate solution three times at 100° C. for 1 hour each. The powder was washed three times with 1000 g of water at 100° C. and then calcined at 550° C. for 2 H to give W0.46A:

| Analytical Results for W046A: | |
| --- | --- |
| Na (wt %) | 0.02 |
| SiO$_2$ (wt %) | 82.26 |
| Al$_2$O$_3$ (wt %) | 18.32 |
| BET Surface Area (m$^2$/g) | 452 |
| Nitrogen Pore Volume (cc/g) | 0.48 |
| Unit Cell (Angstroms) | 24.46 |
| Zeolite Xtallinity | 25 |

W046A was then steamed at 1400° F. for 16 h to give W046B.

| Analytical Results for W046B: | |
| --- | --- |
| BET Surface Area (m$^2$/g) | 308 |
| Nitrogen Pore Volume (cc/g) | 0.45 |

-continued

| Analytical Results for W046B: | |
| --- | --- |
| Unit Cell (Angstroms) | 24.27 |
| Zeolite Xtallinity | 35 |

W053: 20% USY Counterexample Using 3A Gel 10.0 g of LZY-82 which had been previously calcined at 650° C. for two hours was dispersed in 100 g of deionized water with a Waring blender.

400 g of 3A gel (87.07% off at 520° C.; 12.67% solids assume 10% catalytic solids) was dispersed and blended with the zeolite for 5 minutes to give a slurry with a pH of 6.5.

The slurry was dried in a forced draft oven at 92° C. for 18 hours and then ground to a <32 mesh powder. The powder was exchanged with 1000 g of 5% ammonium sulfate solution three times at 100° C. for 1 hour each. The powder was washed three times with 1000 g of water at 100° C. and then calcined at 550° C. for 2 h to give W053A:

| Analytical Results for W053A: | |
| --- | --- |
| Na (wt %) | 0.044 |
| $SiO_2$ (wt %) | 82.6 |
| $Al_2O_3$ (wt %) | 18.4 |
| BET Surface Area (m$^2$/g) | 423 |
| Nitrogen Pore Volume (cc/g) | 0.60 |

W053B was steamed at 1400° F., 16 h to give W053B

| Analytical Results for W053B: | |
| --- | --- |
| BET Surface Area (m$^2$/g) | 211 |
| Nitrogen Pore Volume (cc/g) | 0.52 |
| Unit Cell (Angstroms) | 24.22 |
| Zeolite Xtallinity | 24 |

W0.55: 20% USY Counterexample Using 3A Gel 10.0 g of LZY-82 as dispersed in 100 g of deionized water with a Waring blender to give a dispersion with a pH of 4.7 which dropped after 5 minutes to 3.6.

400 g of 3A gel (87.07% off at 520° C.; 12.67% solids assume 10% catalytic solids) was dispersed and blended with the zeolite dispersion and the pH was adjusted to 4.0 by the addition of 40.5 of 10 weight % concentrated sulfuric acid.

The slurry was dried in a forced draft oven at 90° C. for 18 hours and then ground to a <32 mesh powder. The powder was exchanged with 1000 g of a 5% ammonium sulfate solution three times at 100° C. for 1 hour each. The powder was washed three times with 1000 g of water at 100° C. and then calcined at 550° C. for 2 h to give W055A.

| Analytical Results for W055A: | |
| --- | --- |
| Na (wt %) | 0.028 |
| $SiO_2$ (wt %) | 82.5 |
| $Al_2O_3$ (wt %) | 18.3 |
| BET Surface Area (m$^2$/g) | 423 |
| Nitrogen Pore Volume (cc/g) | 0.48 |
| Unit Cell (Angstroms) | 24.48 |
| Zeolite Xtallinity | 23 |

W055A was then steam at 1400° F. for 16 h to give W055B.

| Analytical Results for W055B: | |
| --- | --- |
| BET Surface Area (m$^2$/g) | 187 |
| Nitrogen Pore Volume (cc/g) | 0.37 |
| Unit Cell (Angstroms) | 24.22 |
| Zeolite Xtallinity | 27 |

Figure 5:
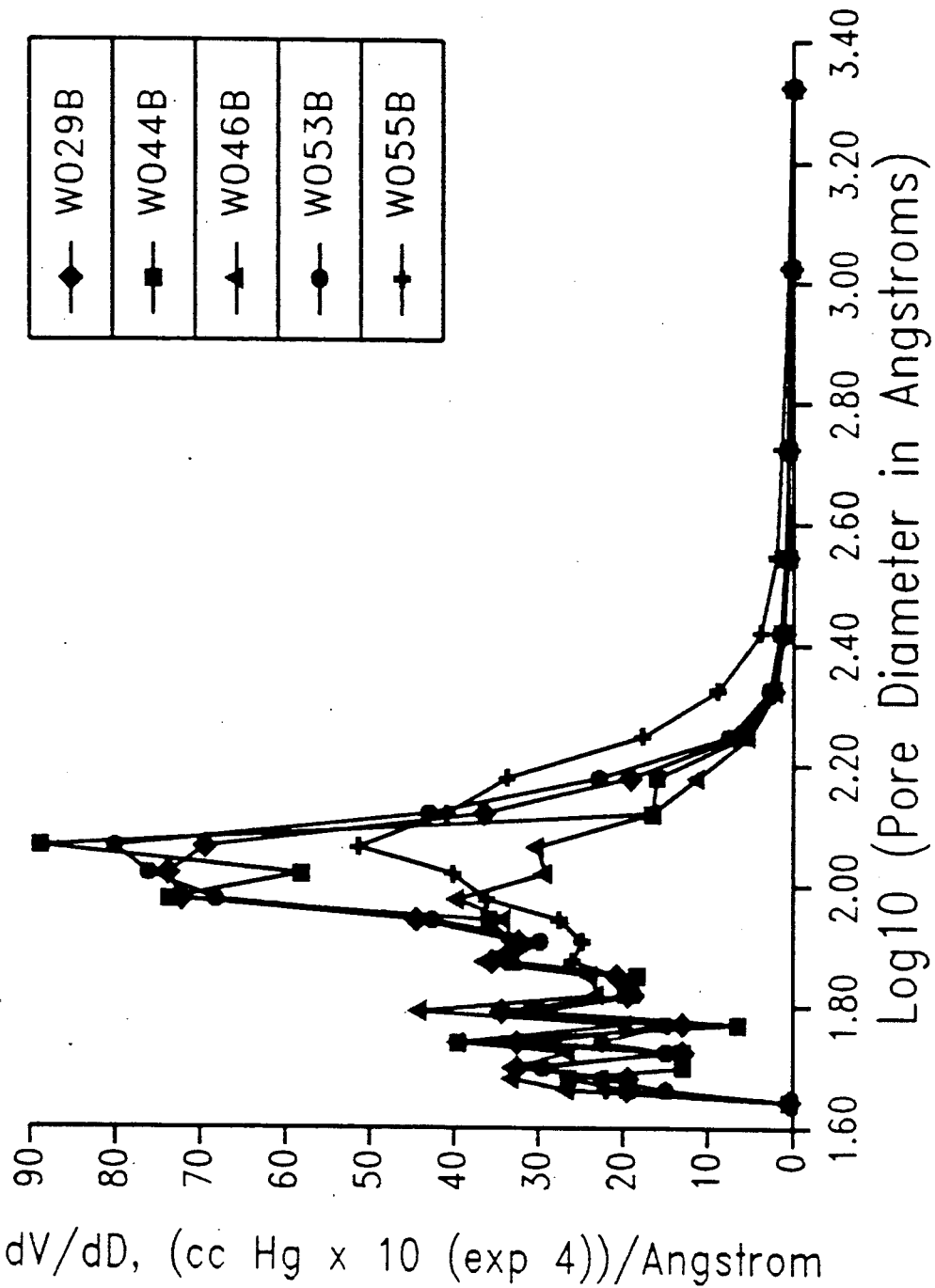
FIG. 5 are plots of pore size distributions for comparative catalysts comprised of 20 wt. % ultrastable Y zeolite and conventional silica alumina gel as a matrix.

A plot of pore size distribution for catalysts W029B, W044B, W046B, W053B, and W055B is found in FIG. 5 hereof.

TABLE VII

Catalysts of this Invention Containing 40% Ultrastable Y Zeolite

| Catalyst/ Feed | MAT Activity | Coke | Specific Coke | $H_2$ | Specific $H_2$ |
| --- | --- | --- | --- | --- | --- |
| V108B/A | 68.5 | 1.75 | 0.80 | .029 | .013 |
| V114B/A | 70.7 | 2.02 | 0.83 | .021 | .009 |
| X005B/A | 64.7 | 1.30 | 0.71 | .020 | .011 |
| X005B/B | 70.7 | 2.40 | 1.00 | .028 | .011 |

TABLE VIII

Catalysts Prepared According to U.S. Pat. Nos. 4,217,240 and 4,272,409 Containing 40% Ultrastable Y Zeolite

| Catalyst/ Feed | MAT Activity | Coke | Specific Coke | $H_2$ | Specific $H_2$ |
| --- | --- | --- | --- | --- | --- |
| V005B/A | 66.3 | 1.75 | 0.89 | .024 | .012 |
| V016A/A | 56.8 | 1.44 | 1.12 | .021 | .015 |
| W020B/A | 63.3 | 1.60 | 0.93 | .035 | .020 |

TABLE IX

Catalysts Prepared with Commercial Silica Alumina Gels and Containing 40% Ultrastable Y Zeolite

| Catalyst/ Feed | MAT Activity | Coke | Specific Coke | $H_2$ | Specific $H_2$ |
| --- | --- | --- | --- | --- | --- |
| W030B/A | 67.8 | 2.03 | 0.96 | .022 | .0104 |
| W054B/A | 65.7 | 1.75 | 0.91 | .027 | .0143 |
| W056B/A | 65.9 | 1.71 | 0.88 | .028 | .0147 |
| X026B/A | 64.8 | 1.78 | 0.97 | .034 | .0185 |
| X026B/B | 72.9 | 3.04 | 1.13 | .035 | .0129 |

PREPARATION OF CATALYSTS CONTAINING 40% USY

V108: 40% USY with Matrix of this Invention 27.8 g of LZY-82 was dispersed in 100 g of water with a Waring blender. 52.5 g of Ludox HS-40 were then blended into the dispersion followed by a solution of 23.5 g of aluminum sulfate hydrate in 100 g of water. Finally a solution of 10.1 g of sodium aluminate in 100 g of water was added to the dispersion which thickened immediately. The gel was dried in a small oven at 180° C. for 21 hours. The resultant dried cake was ground to <40 mesh powder and then exchanged 3x with 500 g of 6% ammonium sulfate solution at 100° C. for 1 hour on a stirring hot plate. The powder was washed 3× with 500 g of water at 100° C. and then calcined at 550° C. for 2 h. The powder was then steamed at 1400° F. for 16 h to give V108B.

| Analytical Results for V108B: | |
| --- | --- |
| Na (wt %) | 0.12 |
| BET Surface Area (m$^2$/g) | 200 |
| Nitrogen Pore Volume (cc/g) | 0.39 |

V114: 40% USY with Matrix of this Invention 28 g of LZY-82 was dispersed in 100 g of water with a Waring blender. A solution of 23.5 g of aluminum sulfate hydrate in 100 g of water was blended into this dispersion followed by 52.5 g of Ludox HS-40. Finally a solution of 10.1 g of sodium aluminate in 100 g of water to the dispersion which thickened immediately. The gel was dried in a small oven at 180° C. for 21 hours. to form a dried cake which was ground to <40 mesh powder and then exchanged 4 times with 500 g of 5% ammonium sulfate solution at 100° C. for 1 hour on a stirring hot plate. The powder was then washed 3× with 500 g of water at 100° C. and calcined at 550° C. for 2 h to give V114A:

| Analytical Results for V114A: | |
|---|---|
| Na (wt %) | 0.079 |
| BET Surface Area (m$^2$/g) | 305 |
| Nitrogen Pore Volume (cc/g) | 0.52 |

The powder was then steamed at 1400° F. for 16 h to give V114B.

| Analytical Results for V114B: | |
|---|---|
| Na (wt %) | 0.0533 |
| BET Surface Area (m$^2$/g) | 211 |
| Nitrogen Pore Volume (cc/g) | 0.43 |
| Unit Cell (Angstroms) | 24.17 |
| Zeolite Xtallinity | 23 |

X005: 40% USY with Matrix of this Invention 40.0 g of LZY-82 was dispersed in 200 g of water with a Waring blender. A solution of 21.5 g of aluminum sulfate hydrate in 200 g of water was blended with the zeolite for 10 s. Then 100 g of Ludox As-40 was added and blended for 10 s to give a slurry with a pH of 3.5. Finally, a solution of 9.8 g of sodium aluminate in 100 g of water was blended into the sol for 1 minute to give a slurry with pH 3.9. This was dried at 139° C. for 72 h to form a dried cake which was ground to <40 mesh powder and then exchanged 3 times wit 1000 g of 5% ammonium sulfate solution at 100° C. for 1 hour on a stirring hot plate. The powder was then washed 3× with 1000 g of water at 100° C. and calcined at 550° C. for 2 h to give W005A.

| Analytical Results for X005A: | |
|---|---|
| Na (wt %) | 0.084 |
| Al$_2$O$_3$ (wt %) | 16.48 |
| SiO$_2$ (wt %) | 78.38 |
| BET Surface Area (m$^2$/g) | 285 |
| Nitrogen Pore Volume: (cc/g) | 0.58 |
| U. Cell: (Angstroms) | 24.45 |
| Zeolite Xtallinity | 28 |

The powder was then steamed at 1400° F. for 16 h to give X005B.

| Analytical Results for X005B: | |
|---|---|
| BET Surface Area (m$^2$/g) | 221 |
| Nitrogen Pore Volume (cc/g) | 0.43 |
| Unit Cell (Angstroms) | 24.22 |
| Zeolite Xtallinity | 36 |

Figure 6:
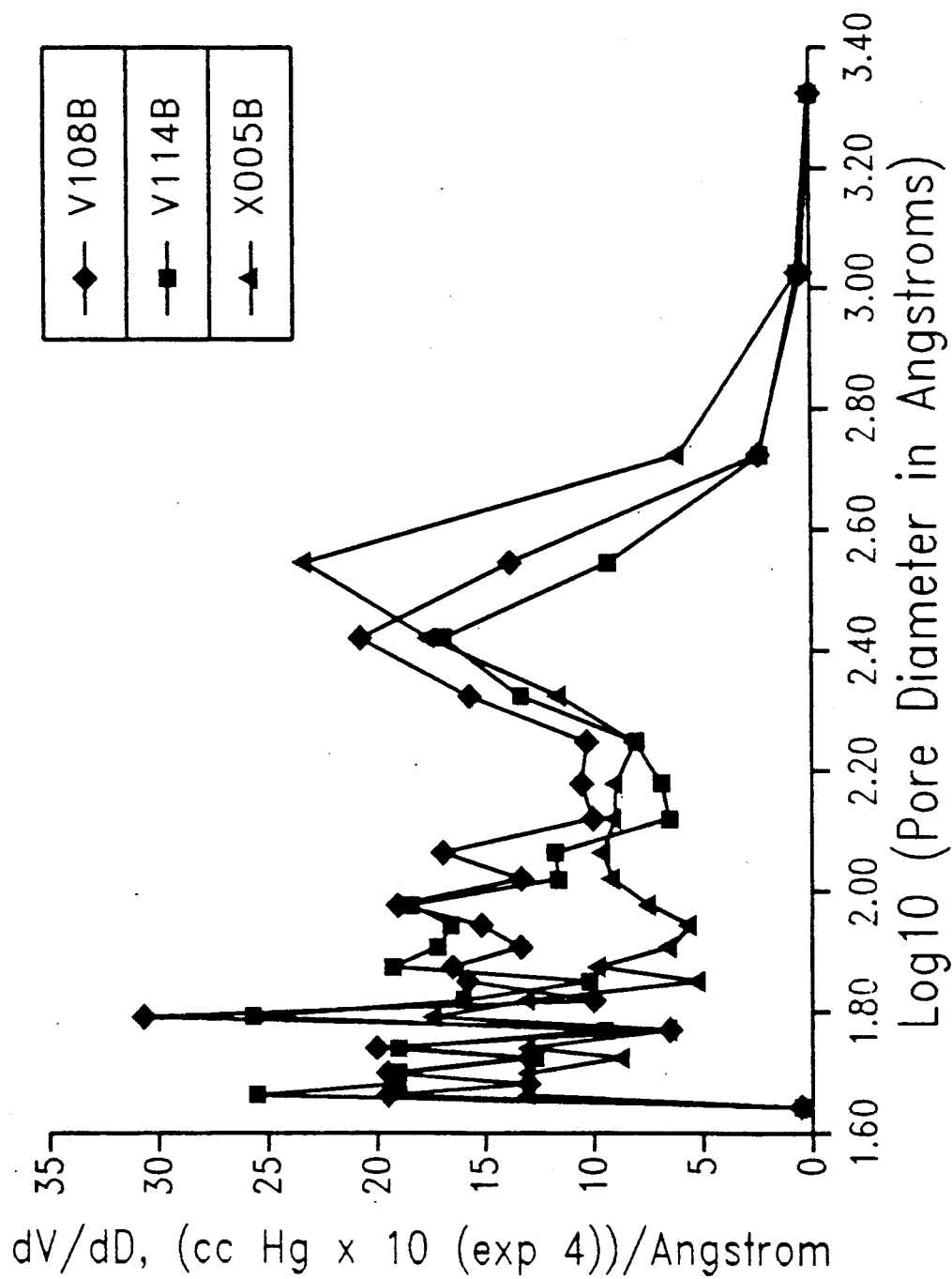
FIG. 6 are plots of pore size distributions for catalysts of this invention containing 40 wt. % ultrastable Y zeolite.
Figure 7:
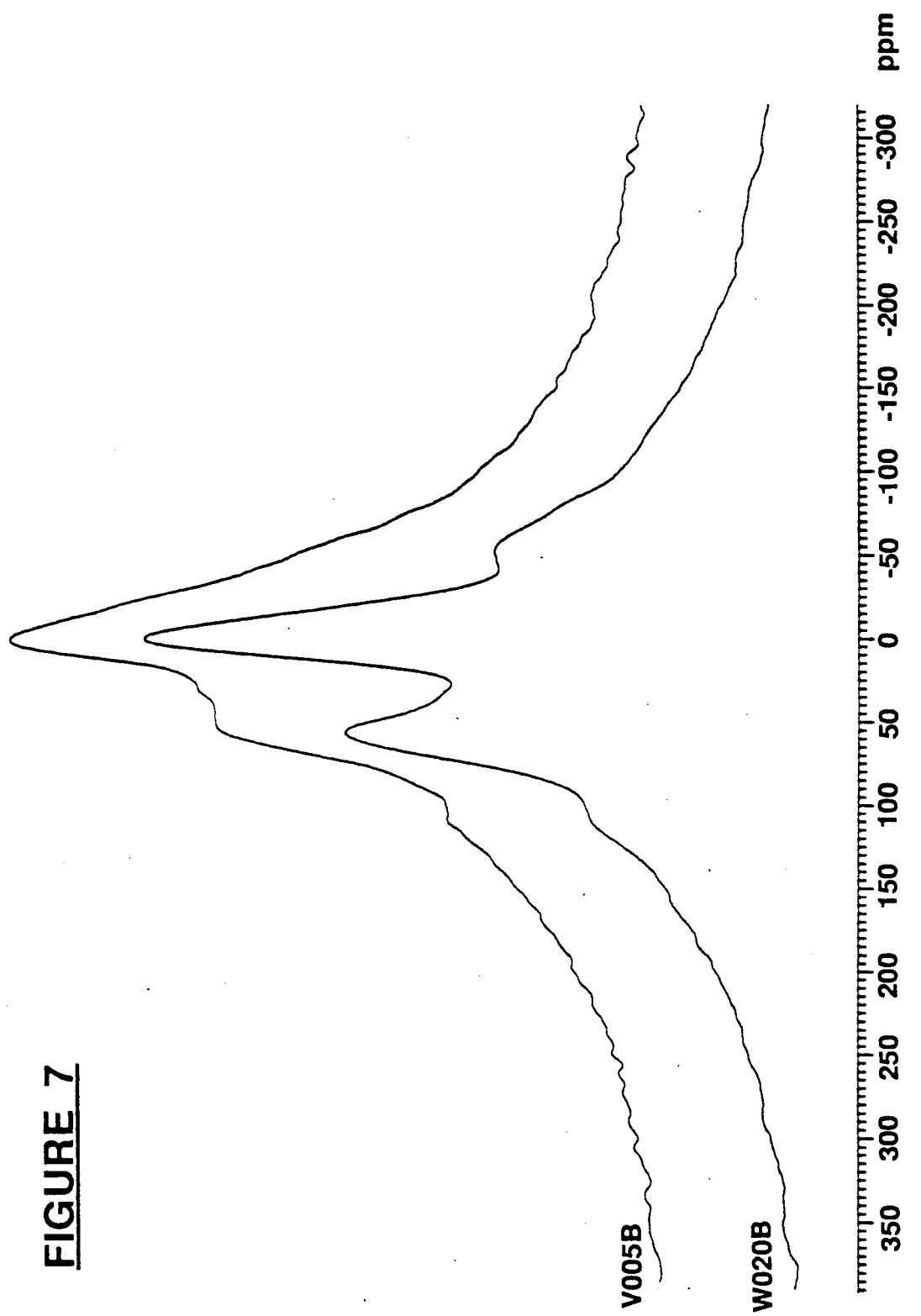
FIG. 7 are plots of $^{27}$Al MASNMR spectra for comparative catalysts containing 40 wt. % ultrastable Y zeolite.

A plot of pore size distribution for catalysts V108, V114, and X005 is found in FIG. 6 hereof.

EXAMPLES NOT OF THIS PROPOSED INVENTION CONTAINING 40% USY PREPARED ACCORDING TO U.S. PAT. NOS. 4,217,240 AND 4,272,409

V005: 40% USY Counterexample Whose Matrix was Prepared According to U.S. Pat. Nos. 4,217,240 and 4,272,409

237.5 g of Ludox HS-40 was blended with 213 cc of a 5 weight % sodium aluminate solution for 5 minutes. To this was added 87.46 g of LZY-82 and 100 cc of deionized water. The resulting mixture was blended another 5 minutes. The slurry was evaporated to dryness at 115° C. for several days then ground and screened to 100/200 mesh powder. 144 g of the resulting powder were then exchanged with 1440 g of 1 M ammonium sulfate solution and then washed in 500 cc of boiling water for ½ hour 3×. The powder was then filtered and air-dried, calcined at 500° C. for 2 h and steamed at 1400° F. for 16 h to give V005B.

| Analytical Results for V005B: | |
|---|---|
| Na (wt %) | 0.30 |
| SiO$_2$ (wt %) | 88.2 |
| Al$_2$O$_3$ (wt %) | 10.1 |
| BET Surface Area (m$^2$/g) | 295 |
| Nitrogen Pore Volume (cc/g) | 0.49 |

V016: 40% USY Counterexample Whose Matrix was Prepared According to U.S. Pat. Nos. 4,217,240 and 4,272,409

148.5 g of Ludox As-40 was blended with 36.2 cc of a 3 weight % sodium aluminate solution for 5 minutes. To this was added 52 g of LZY-82 and 100 cc of deionized water. The resulting mixture was blended another 5 minutes. The slurry was evaporated to dryness at 115° C. for 16 h then ground and screened to 100/200 mesh powder. 83 g of the resulting powder was then exchanged with 830 g of 1M ammonium sulfate solution and then washed in 500 cc of boiling water for ½ hour 3×. The powder was then filtered and air-dried, calcined at 500° C. for 2 h to give V016.

| Analytical Results for V016: | |
|---|---|
| Na (wt %) | 0.23 |
| SiO$_2$ (wt %) | 89.0 |
| Al$_2$O$_3$ (wt %) | 9.28 |
| BET Surface Area (m$^2$/g) | 285 |
| Nitrogen Pore Volume (cc/g) | 0.37 |

V016 was steamed at 1400° F. for 16 h to give V016A.

| Analytical Results for V016A: | |
|---|---|
| BET Surface Area (m$^2$/g) | 251 |
| Nitrogen Pore Volume (cc/g) | 0.38 |

W020: 40% USY Counterexample Whose Matrix was Prepared According to U.S. Pat. Nos. 4,217,240 and 4,272,409

4.17 g of LZY-82 was dispersed in 200 g of water with a Waring blender. 90.0 g of Ludox HS-40 were then blended into the dispersion for 10 seconds. Finally a solution of 16.3 g of sodium aluminate in 200 g of water was added to the dispersion which remained a slurry. The gel was dried in a small oven at 111° C. for 18 hours. The resultant dried cake was ground to <40 mesh powder and then exchanged 3× with 1000 g of 6% ammonium sulfate solution at 100° C. for 1 hour on a stirring hot plate. The powder was washed 3× with 1000 g of water at 100° C. and then calcined at 550° C. for 2 h to give W020A:

| Analytical Results for W020A: | |
|---|---|
| Na (wt %) | 0.132 |
| BET Surface Area ($m^2/g$) | 366 |
| Nitrogen Pore Volume (cc/g) | 0.45 |
| Unit Cell (Angstroms) | 24.50 |
| Zeolite Xtallinity | 56 |

The powder was then steamed at 1400° F. for 16 h to give W020B

| Analytical Results for W020B: | |
|---|---|
| BET Surface Area ($m^2/g$) | 270 |
| Nitrogen Pore Volume (cc/g) | 0.45 |
| Unit Cell (Angstroms) | 24.25 |
| Zeolite Xtallinity | 41 |

Figure 8:
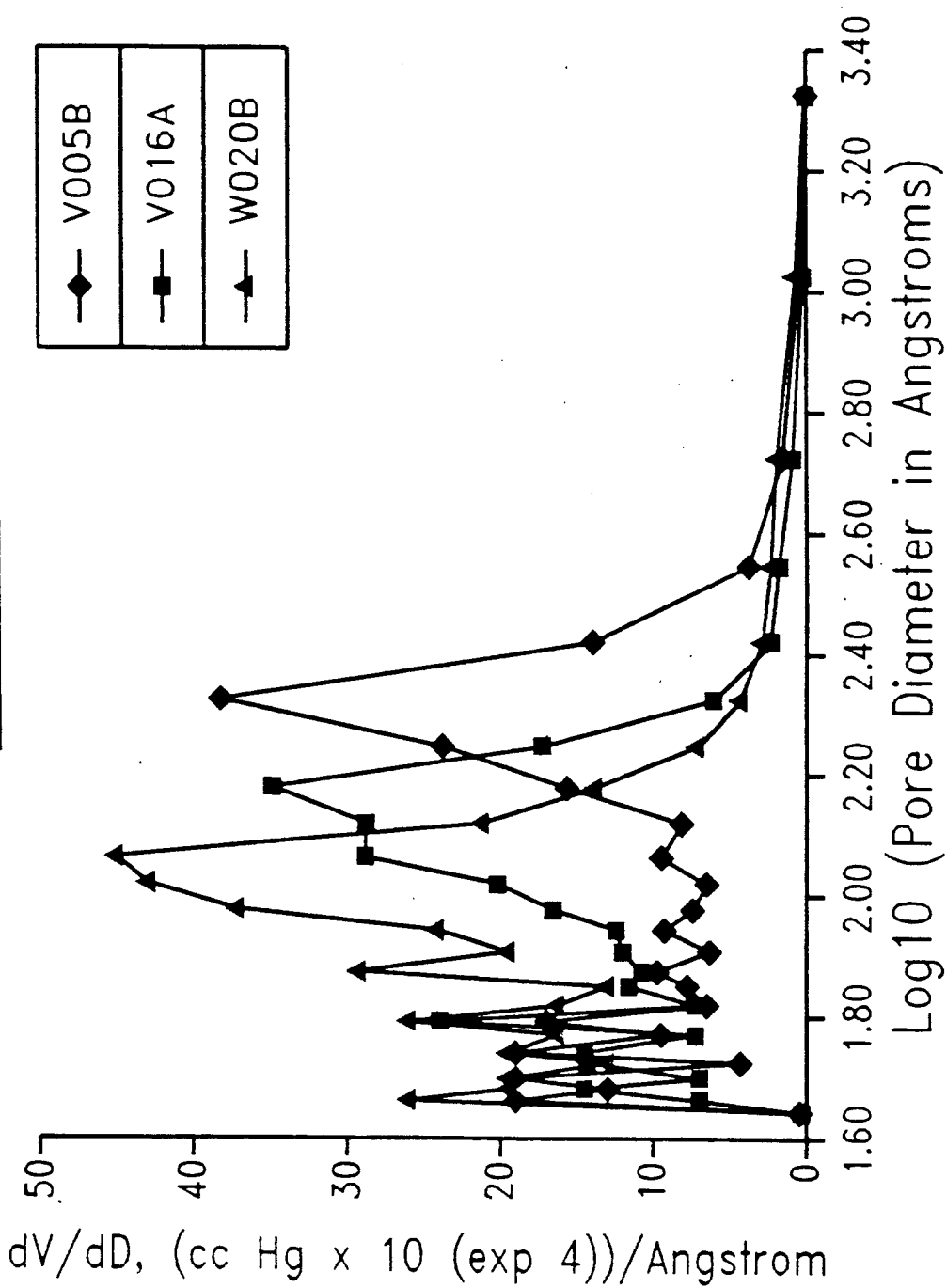
FIG. 8 are plots of pore size distributions for comparative catalysts containing 40 wt. % ultrastable Y zeolite.

A plot of pre size distribution for catalysts V005, V016 and W020 is found is FIG. 8 hereof.

EXAMPLE NOT OF THIS PROPOSED INVENTION CONTAINING 40% USY PREPARED WITH COMMERCIAL SILICA-ALUMINA GEL

W030: 40% USY Counterexample Using 3A Gel 27.8 g of LZY-82 was dispersed in 100 g of deionized water with a Waring blender.

250 g of 3A gel (87.07% off at 520° C.; 12.67% solids assume 10% catalytic solids) was dispersed and blended with the zeolite for 5 minutes to give a slurry with a pH of 6.7.

The slurry was dried in a forced draft oven at 120° C. for 18 hours and then ground to a <32 mesh powder. The powder was exchanged with 1000 g of a 5% ammonium sulfate solution three times at 100° C. for 1 hour each. The powder was washed three times with 1000 g of water at 100° C. and then calcined at 550° C. for 2 h to give W030A:

| Analytical Results for W030A: | |
|---|---|
| Na (wt %) | 0.084 |
| $SiO_2$ (wt %) | 78.42 |
| $Al_2O_3$ (wt %) | 19.23 |
| BET Surface Area ($m^2/g$) | 505 |
| Nitrogen Pore Volume (cc/g) | 0.63 |
| Unit Cell (Angstroms) | 24.49 |
| Zeolite Xtallinity | 40 |

W030A was then steamed at 1400° C. for 16 h to give W030B.

| Analytical Results for W030B: | |
|---|---|
| BET Surface Area ($m^2/g$) | 318 |
| Nitrogen Pore Volume (cc/g) | 0.50 |
| Unit Cell (Angstroms) | 24.24 |
| Zeolite Xtallinity | 51 |

W054: 40% USY Counterexample Using 3A Gel 20.0 g of LZY-82 was dispersed in 100 g of deionized water with a Waring blender.

250 g of 3A gel (87.07% off at 520° C.; 12.67% solids assume 10% catalytic solids) was dispersed and blended with the zeolite for 5 minutes to give a slurry with a pH of 6.7.

The slurry was dried in a forced draft oven at 90° C. for 18 hours and then ground to a <32 mesh powder. The powder was exchanged with 1000 g of a 5% ammonium sulfate solution three times at 100° C. for 1 hour each. The powder was washed three times with 1000 g of water at 100° C. and then calcined at 550° C. for 2 h to give W054A:

| Analytical Results for W054A: | |
|---|---|
| Na (wt %) | 0.068 |
| $SiO_2$ (wt %) | 81.2 |
| $Al_2O_3$ (wt %) | 19.1 |
| BET Surface Area ($m^2/g$) | 467 |
| Nitrogen Pore Volume (cc/g) | 0.71 |

W054A was then steamed at 1400° F. for 16 h to give W054B.

| Analytical Results for W054B: | |
|---|---|
| BET Surface Area ($m^2/g$) | 276 |
| Nitrogen Pore Volume (cc/g) | 0.57 |
| Unit Cell (Angstroms) | 24.24 |
| Zeolite Xtallinity | 126 |

W056: 40% USY Counterexample Using 3A Gel 20.0 g of LZY-82 was dispersed in 100 g of deionized water with a Waring blender.

250 g of 3A gel (87.07% off at 520° C.; 12.67% solids assume 10% catalytic solids) was dispersed and blended with the zeolite dispersion and the pH was adjusted to 4.0 by the addition of 31.1 g of 10 weight % concentrated sulfuric acid.

The slurry was dried in a forced draft oven at 90° C. for 18 hours and then ground to a <32 mesh powder. The powder was exchanged with 1000 g of a 5% ammonium sulfate solution three times at 100° C. for 1 hour each. The powder was washed three times with 1000 g of water at 100° C. and the calcined at 550° C. for 2 h to give W056A:

| Analytical Results for W056A: | |
|---|---|
| Na (wt %) | 0.067 |
| $SiO_2$ (wt %) | 81.2 |
| $Al_2O_3$ (wt %) | 18.1 |
| BET Surface Area ($m^2/g$) | 477 |
| Nitrogen Pore Volume (cc/g) | 0.56 |

W056A was then steamed at 1400° C. for 16 h to give W056B.

| Analytical Results for W056B: | |
|---|---|
| BET Surface Area (m²/g) | 254 |
| Nitrogen Pore Volume (cc/g) | 0.44 |
| Unit Cell (Angstroms) | 24.24 |
| Zeolite Xtallinity | 123 |

Figure 9:
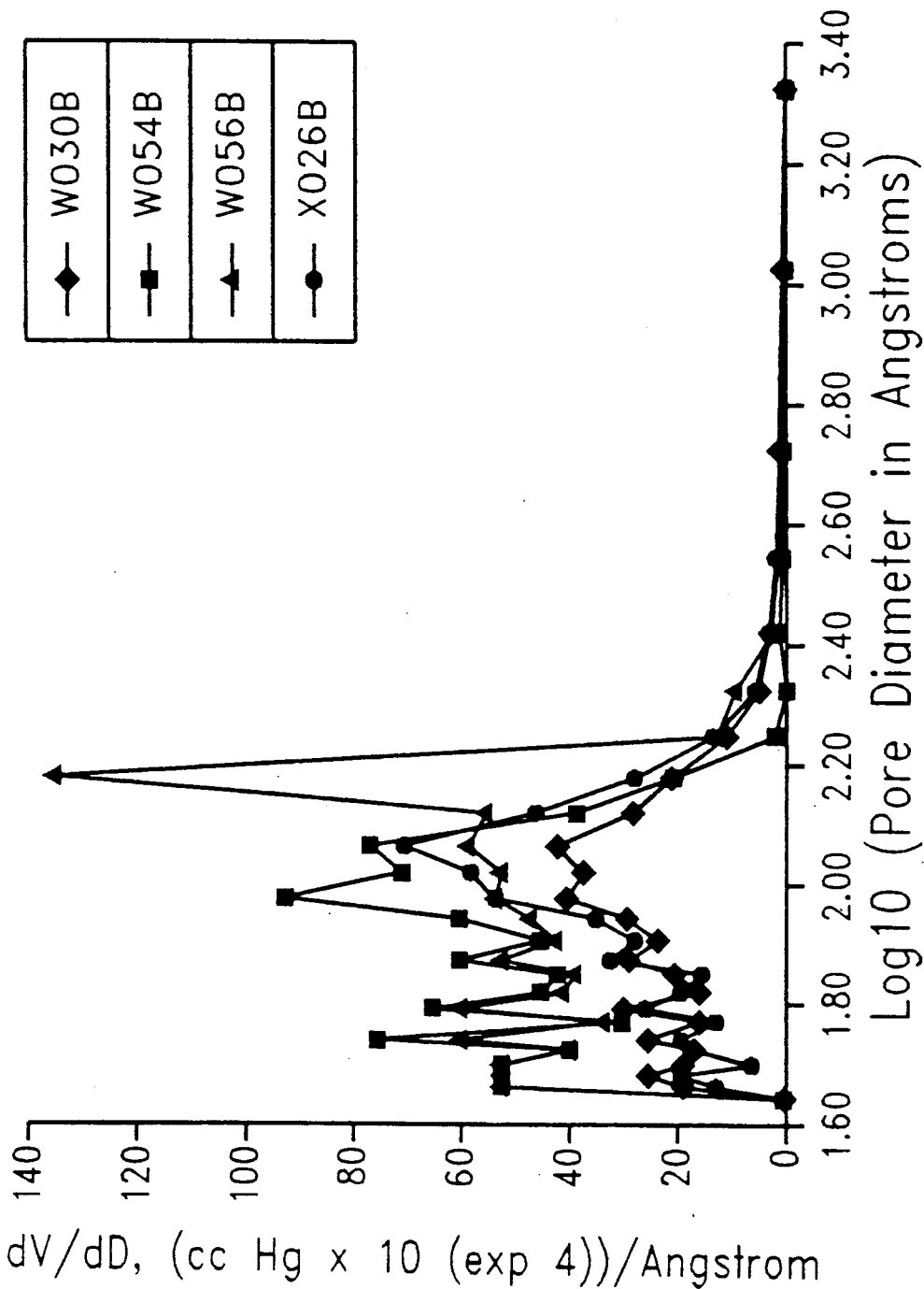
FIG. 9 are plots of pore size distributions for comparative catalysts comprised of 40 wt. % ultrastable Y zeolite in a conventional silicaalumina matrix.

A plot of pore size distribution for catalysts W030B, W054B, W056B and X026B is found in FIG. 9 hereof.

TABLE X

Catalysts of this Invention Containing 40% Rare-Earth-Exchanged High-Silica Faujasite

| Catalyst/Feed | MAT Activity | Coke | Specific Coke | $H_2$ | Specific $H_2$ |
|---|---|---|---|---|---|
| W022B/A | 73.0 | 1.79 | 0.66 | .014 | .005 |
| W067B/A | 69.9 | 1.48 | 0.63 | .015 | .006 |
| W074B/A | 71.1 | 1.78 | 0.72 | .072 | .015 |
| X003B/A | 67.5 | 1.11 | 0.53 | .015 | .007 |
| W067B/B | 74.6 | 2.13 | 0.72 | .018 | .006 |
| W074B/B | 75.3 | 2.38 | 0.78 | .016 | .005 |
| X003B/B | 74.4 | 2.01 | 0.69 | .020 | .007 |

TABLE XI

Catalyst Prepared According to U.S. Pat. Nos. 4,217,240 and 4,272,409 and Containing 40% Rare-Earth-Exchanged High-Silica Faujasite

| Catalyst/Feed | MAT Activity | Coke | Specific Coke | $H_2$ | Specific $H_2$ |
|---|---|---|---|---|---|
| V110B/A | 74.8 | 2.99 | 1.01 | .033 | .011 |

TABLE XII

Catalysts Prepared with Commercial Silica Alumina Gel and Containing 40% Rare-Earth-Exchanged High-Silica Faujasite

| Catalyst/Feed | MAT Activity | Coke | Specific Coke | $H_2$ | Specific $H_2$ |
|---|---|---|---|---|---|
| X028B/A | 72.3 | 2.03 | 0.78 | .016 | .006 |
| X028B/B | 78.4 | 3.56 | 0.98 | .025 | .007 |

PREPARATION OF SAMPLES OF RARE-EARTH-EXCHANGED HIGH SILICA FAUJASITE

V091A: Preparation of Rare-earth Exchanged LZ-210

1005 g of LZ-210 (a high silica faujasite available from Union Carbide Corp.) was dispersed in 1500 g of water. To this was added a solution of 760 g of "Didyminium" nitrate hydrate in 1000 g of water. The pH of the resulting slurry was 3.1. Sufficient ammonium hydroxide was added to raise the pH to around 4 and the slurry was heated to 100° C. for 2 h. The slurry was filtered and washed twice with ca. 2000 g of water at ambient temperature. The filter cake was then calcined at 600° C. for 2 h to give V091A.

| Analytical Results for V091A: | |
|---|---|
| Rare Earth Oxides (wt %) | 11.04 |
| BET Surface Area (m²/g) | 603 |
| Nitrogen Pore Volume (cc/g) | 0.32 |
| Unit Cell (Angstroms) | 24.51 |

W001: Preparation of La-exchanged LZ-210

1000 g of LZ-210 was dispersed in 2000 g of water. To this was added a solution of 760 g of lanthanum nitrate hydrate in 1000 g of water. The pH of the resulting slurry was 3.1. Sufficient ammonium hydroxide was added to raise the pH to around 6 and the slurry was heated to 100° C. for 3 h. The slurry was filtered and washed twice with ca. 2000 g of water at ambient temperature. The filter cake was then calcined at 600° C. for 2 h to give W001A.

| Analytical Results for W001A: | |
|---|---|
| Na (wt %) | 0.54 |
| $SiO_2$ (wt %) | 76.58 |
| $Al_2O_3$ (wt %) | 14.61 |
| Rare earth oxides (wt %) | 8.68 |
| BET Surface Area (m²/g) | 626 |
| Nitrogen Pore Volume (cc/g) | 0.37 |
| Unit Cell (Angstroms) | 24.53 |

418 g of W001A were dispersed in 2000 g of deionized water with 500 g of lanthanum nitrate hexahydrate (FW:433 g). Ammonium hydroxide was added to raise the pH to 4. The suspension was stirred for 2 h at 100° C. and cooled. The pH after cooling was 5.5. The suspension was filtered and washed 2× with 2500 g of deionized water at ambient temperature and then calcined at 550° C. for 2 to give W001C.

| Analytical Results for W001C: | |
|---|---|
| Na (wt %) | 0.14 |
| Rare Earth Oxides (wt %) | 12.36 |
| BET Surface Area (m²/g) | 581 |
| Nitrogen Pore Volume (cc/g) | 0.395 |
| Unit Cell (Angstroms) | 24.53 |

X014A 500 g of LZ-210 was dispersed in 3000 g of water. To this was added a solution of 500 g of lanthanum nitrate hexahydrate (FW:439 g). The slurry was heated to 100° C. for 2 h. The slurry was filtered and washed three times with ca. 2000 g of water at ambient temperature. The filter cake was then calcined at 600° C. for 2 h to give X014A.

| Analytical Results for X014A: | |
|---|---|
| $Al_2O_3$ (wt %) | 14.16 |
| $SiO_2$ (wt %) | 76.91 |
| Na (wt %) | 0.55 |
| Rare Earth Oxides (wt %) | 9.03 |
| BET Surface Area (m²/g) | 570 |
| Nitrogen Pore Volume (cc/g) | 0.37 |
| Unit Cell (Angstroms) | 24.51 |

EXAMPLES OF THIS PROPOSED INVENTION CONTAINING 40% RARE-EARTH-EXCHANGED HIGH-SILICA FAUJASITE

W022: 40% Rare-earth Exchanged High Silica Faujasite with Matrix of this Invention 30 g of V091A described previously was dispersed in 200 g of water with a Waring blender. A solution of 21.5 g of aluminum sulfate hydrate in 200 g of water was then blended into the dispersion for 10 s followed by 100 g of Ludox HS-40 for another 10 s. to give a slurry with pH 3.3. Finally a solution of 9.8 g of sodium aluminate in 100 g of water was blended in for 60 s to give a gel of pH 4.1. The slurry was dried at 111° C. for 18 h. The resultant dried cake was ground to <40 mesh powder and then exchanged 3× with 1000 g of 5% ammonium sulfate solution at 100° C. for 1 hour on a stirring hot plate. The powder was washed 3× with 1000 g of water at 100° C. and then calcined at 550° C. for 2 h. to give W022A.

| Analytical Results for W022A: | |
|---|---|
| Na (wt %) | 0.049 |
| Rare earth oxides (wt %) | 1.99 |
| BET Surface Area (m$^2$/g) | 301 |
| Nitrogen Pore Volume (cc/g) | 0.54 |
| Unit Cell (Angstroms) | 24.46 |
| Zeolite Xtallinity | 85 |

The powder was then steamed at 1400° F. for 16 h to give W022B.

| Analytical Results for W022B: | |
|---|---|
| MAT (FS-5078) in duplicate | 72.5/0.0142/1.74 |
| BET Surface Area (m$^2$/g) | 228 |
| Nitrogen Pore Volume (cc/g) | 0.50 |
| Unit Cell (Angstroms) | 24.31 |
| Zeolite Xtallinity | 55 |

W067: 40% Rare-earth Exchanged High Silica Faujasite with Matrix of this Invention 30.0 g of V091A described previously was dispersed in 200 g of water with a Waring blender. A solution of 21.5 g of aluminum sulfate hydrate in 200 g of water was then blended into the dispersion for 10 s followed by 100 g of Ludox AS-40 for another 10 s. to give a slurry with pH 2.8. Finally a solution of 9.8 g of sodium aluminate in 100 g of water was blended in for 60 s. to give a gel of pH 4.5. The slurry was dried at 130° C. for 16 h. The resultant dried cake was ground to <40 mesh powder and then exchanged 3× with 1000 g of 5% ammonium sulfate solution at 100° C. for 1 hour on a stirring hot plate. The powder was washed 3× with 1000 g of water at 100° C. and then calcined at 550° C. for 2 h. to give W067A.

| Analytical Results for W067A: | |
|---|---|
| Na (wt %) | 0.057 |
| SiO$_2$ (wt %) | 83.18 |
| Al$_2$O$_3$ (wt %) | 14.38 |
| Rare earth oxides (wt %) | 1.56 |
| BET Surface Area (m$^2$/g) | 236 |
| Nitrogen Pore Volume (cc/g) | 0.54 |
| Unit Cell (Angstroms) | 24.46 |
| Zeolite Xtallinity | 37 |

The powder was then steamed at 1400° F. for 16 h to give W067B.

| Analytical Results for W067B: | |
|---|---|
| BET Surface Area (m$^2$/g) | 211/229 |
| Nitrogen Pore Volume (cc/g) | 0.54/.602 |
| Unit Cell (Angstroms) | 24.30 |
| Zeolite Xtallinity | 47 |

W074: 40% Rare-earth Exchanged High Silica Faujasite with Matrix of this Invention 30.0 g of V091A described previously was dispersed in 200 g of water with a Waring blender. A solution of 21.5 g of aluminum sulfate hydrate in 200 g of water was then blended into the dispersion for 10 s followed by 100 g of Ludox AS-40 for another 10 s. to give a slurry with pH 3.0. Finally a solution of 9.8 g of sodium aluminate in 100 g of water was blended in for 60 s. to give a gel of pH 4.4. The slurry was dried at 150° C. for 16 h. The resultant dried cake was ground to <40 mesh powder and then exchanged 3× with 1000 g of 5% ammonium sulfate solution at 100° C. for 1 hour on a stirring hot plate. The powder was washed 3× with 1000 g of water at 100° C. and then calcined at 550° C. for 2 h. to give W074A.

| Analytical Results for W074A: | |
|---|---|
| Na (wt %) | .0229 |
| SiO$_2$ (wt %) | 82.97 |
| Al$_2$O$_3$ (wt %) | 14.99 |
| BET Surface Area (m$^2$/g) | 431 |
| Nitrogen Pore Volume (cc/g) | .565 |
| Unit Cell (Angstroms) | 24.45 |
| Zeolite Xtallinity | 46 |

The powder was then steamed at 1400° F. for 16 h to give W047B.

| Analytical Results for W074B: | |
|---|---|
| BET Surface Area (m$^2$/g) | 211 |
| Nitrogen Pore Volume (cc/g) | 0.511 |
| Unit Cell (Angstroms) | 24.31 |
| Zeolite Xtallinity | 50 |

X003: 40% Rare-earth Exchanged High Silica Faujasite with Matrix of this Invention 30.0 g of W001C described previously was dispersed in 200 g of water with a Waring blender. A solution of 21.5 of aluminum sulfate hydrate in 200 g of water was then blended into the dispersion for 10 s followed by 100 g of Ludox AS-40 for another 10 s. to give a slurry with pH 2.9. Finally a solution of 9.8 g of sodium aluminate in 100 g of water was blended in for 60 s. to give a gel of pH 3.7. The slurry was dried at 139° C. for 16 h. The resultant dried cake was ground to <40 mesh powder and then exchanged 3× with 1000 g of 5% ammonium sulfate solution at 100° C. for 1 hour on a stirring hot plate. The powder was washed 3× with 1000 g of water at 100° C. and then calcined at 550° C. for 2 h. to give X003A:

| Analytical Results for X003A: | |
|---|---|
| Na (wt %) | 0.065 |
| Al$_2$O$_3$ (wt %) | 14.84 |
| SiO$_2$ (wt %) | 79.85 |
| Rare earth oxides (wt %) | 2.45 |
| BET Surface Area (m$^2$/g) | 273 |
| Nitrogen Pore Volume (cc/g) | 0.61 |
| U.Cell: (Angstroms) | 24.47 |
| Zeolite Xtallinity | 35 |

The powder was then steamed at 1400° F. for 16 h to give X003B.

| Analytical Results for X003B: | |
|---|---|
| MAT (FS-5078) | 67.5/.0152/1.108 |
| MAT (FS-5363) | 74.4/.0196/2.006 |
| BET Surface Area (m$^2$/g) | 209 |
| Nitrogen Pore Volume (cc/g) | 0.43 |
| Unit Cell (Angstroms) | 24.35 |

| Analytical Results for X003B: | |
|---|---|
| Zeolite Xtallinity | 50 |

Figure 10:
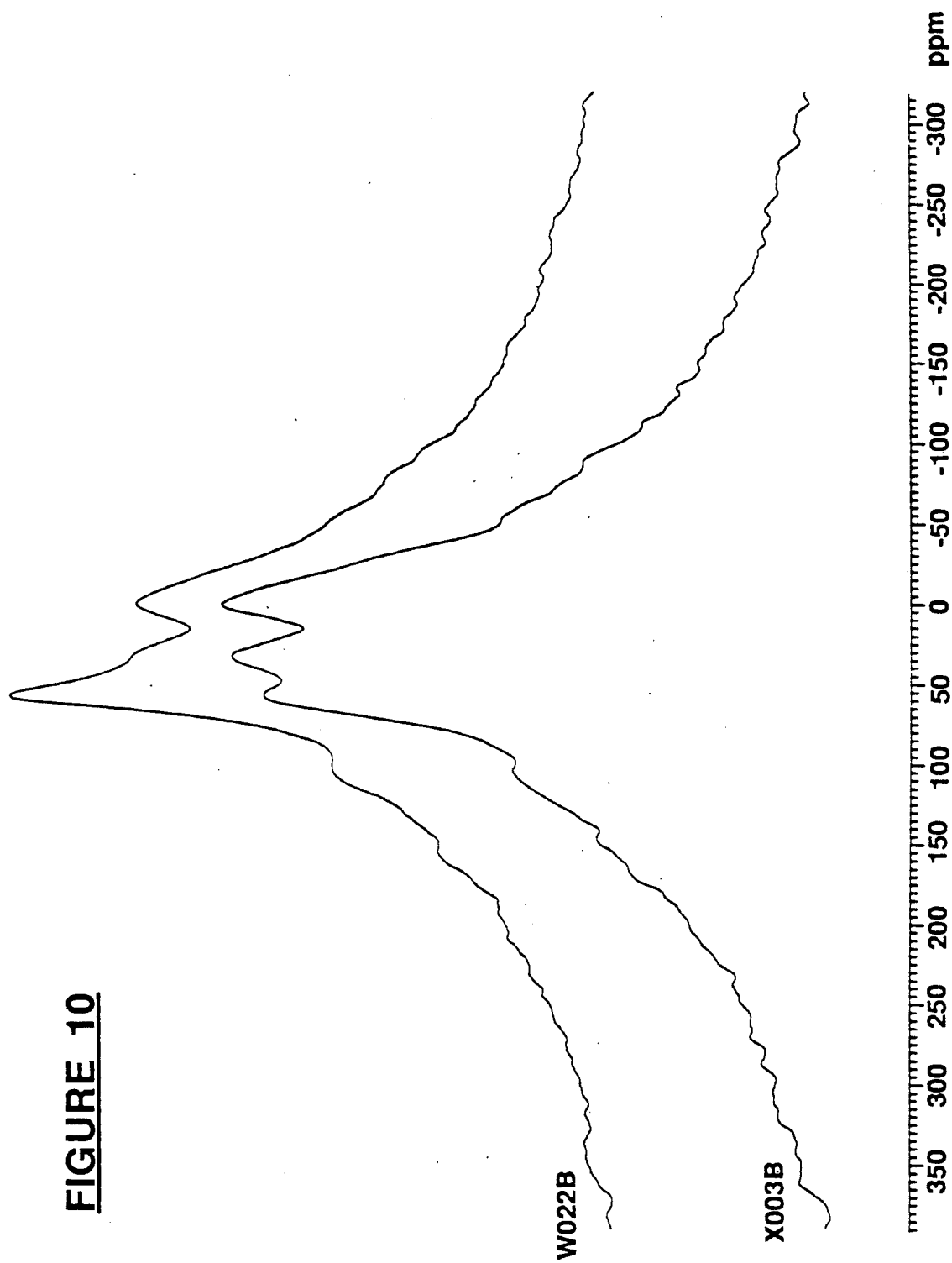
FIG. 10 are plots of $^{27}$Al MASNMR spectra for catalysts of this invention containing 40 wt. % rare-earth-exchanged high silica faujasite.

A plot of $^{27}$Al MASNMR for catalysts W022B and X003B is found in FIG. 10 hereof. While the plot for catalyst X003B shows the 0 ppm $^{27}$Al MASNMR peak to be the dominant peak, it is nevertheless less than 10% greater than any other peak.

Figure 11:
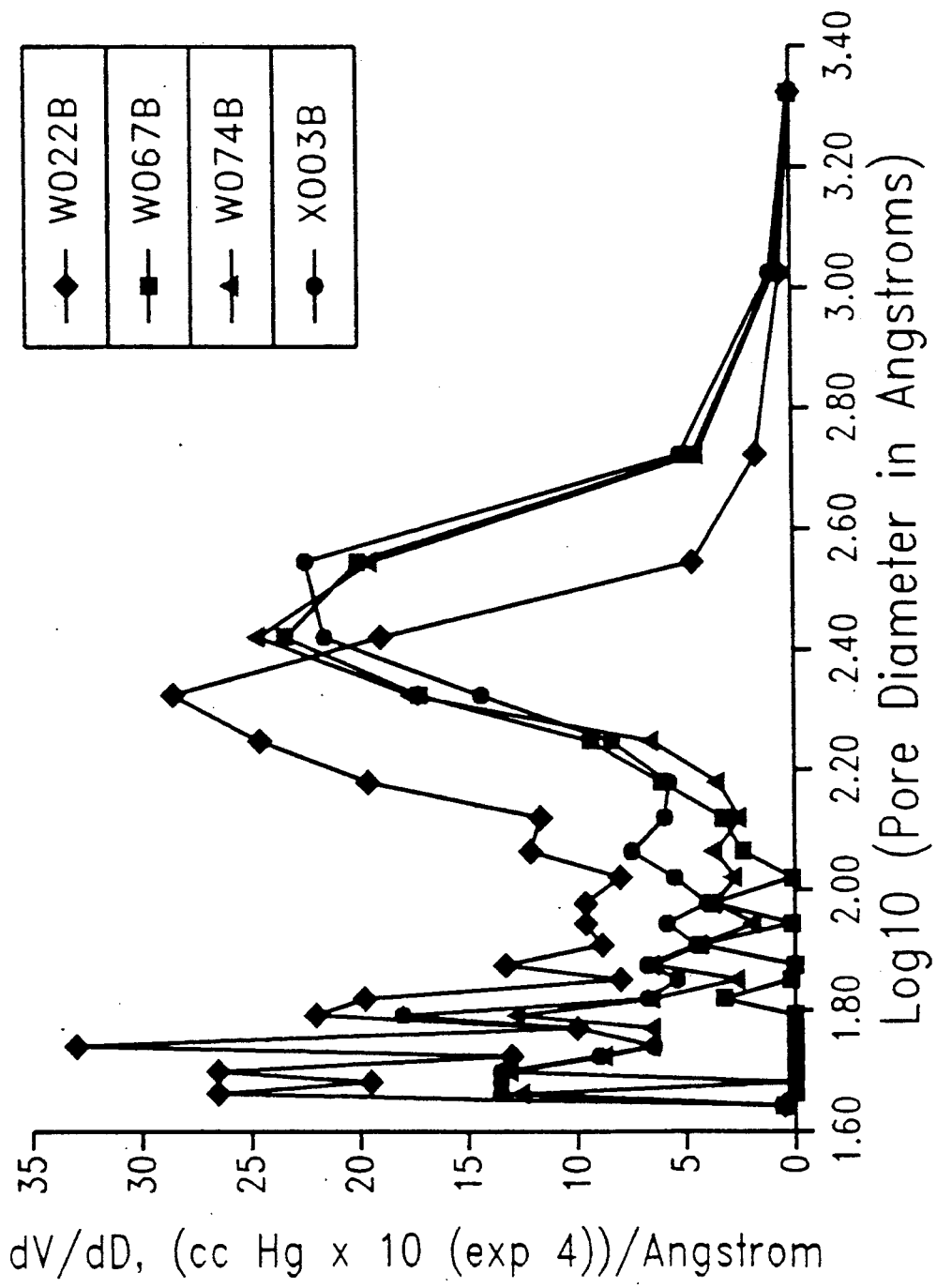
FIG. 11 are plots of pore size distributions for catalysts of this invention containing 40 wt. % rare-earth-exchanged high silica faujasite.

A plot of pore size distribution for catalyst W022, W067, W074, and X003 is found in FIG. 11 hereof.

EXAMPLE NOT OF THIS PROPOSED INVENTION CONTAINING 40% RARE-EARTH-EXCHANGED HIGH SILICA FAUJASITE AND PREPARED ACCORDING TO U.S. PAT. NOS. 4,217,240 AND 4,272,409

V110: 40% Rare-earth-exchanged High Silica Faujasite Counterexample Whose Matrix was Prepared According to U.S. Pat. Nos. 4,217,240 and 4,272,409

20.0 g of V091A described previously was dispersed in 100 g of water with a Waring blender. A solution of 9.8 g of aluminum sulfate hydrate in 100 g of water was then blended into the dispersion for 10 s followed by 60 g of Ludox HS-40 for another 10 s. to give a slurry with pH 3.3. Finally a solution of 8.2 g of sodium aluminate in 100 g of water was blended in for 60 s to give a gel of pH greater than 7. The slurry was dried in a small oven at 180° C. for 21 h. The resultant dried cake was ground to <40 mesh powder and then exchanged 3× with 500 g of 5% ammonium sulfate solution at 100° C. for 1 hour on a stirring hot plate. The powder was washed 3× with 500 g of water at 100° C. and then calcined at 550° C. for 2 h. The powder was then steamed at 1400° F. for 16 h to give V110B.

| Analytical Results for V110B: | |
|---|---|
| Na | 516 ppm |
| BET Surface Area (m²/g) | 301 |
| Nitrogen Pore Volume (cc/g) | 0.54 |

EXAMPLE NOT OF THIS PROPOSED INVENTION CONTAINING 40% RARE-EARTH-EXCHANGED HIGH SILICA FAUJASITES PREPARED WITH COMMERCIAL SILICA-ALUMINA GEL

X028: 40% Rare-earth Exchanged High Silica Faujasite Counterexample Made with Commercial Silica Aluminas 22.5 g of X014A (a lanthanum-exchanged LZ210) was dispersed in 100 g of deionized water with a Waring blender.

375 g of 3A gel (87.7% volatiles at 520° C.; 12.67% solids assume 10% catalytic solids) was dispersed and blended with the zeolite dispersion for five minutes to give a pH of 6.3.

The slurry was dried in a forced draft oven at 140° C. for 18 hours and then ground to a <32 mesh powder. The powder was exchanged with 2000 g of a 10% ammonium sulfate solution three times at 100° C. for 1 hour each. The powder was washed three times with 2000 g of water at 100° C. and then calcined at 550° C. for 2 h to give X028A:

| Analytical Results for X028A: | |
|---|---|
| Na (wt %) | 0.0359 |
| BET Surface Area (m²/g) | 476 |
| Nitrogen Pore Volume (cc/g) | 0.74 |

X028A was then steamed at 1400° F. for 16 h to give X028B.

| Analytical Results for X028B: | |
|---|---|
| BET Surface Area (m²/g) | 300 |
| Nitrogen Pore Volume (cc/g) | 0.63 |

A plot of pore size distribution for catalysts V110 and X028 is found in FIG. 12 hereof.

What is claimed is:

1. A monodispersed mesoporous aluminosilicate catalyst matrix material comprised of about 5 to 40% by weight alumina with the balance being silica, which matrix material is characterized (a) as having a pore size distribution from about 200 to about 500 Angstroms; and (b) a 0 ppm $^{27}$Al MASNMR peak after steaming at 1400° F. for 16 hours, which is no more than 10% greater than any other MASNMR peak; and (c) no more than 40% of the surface area is lost after steaming at 1400° F. for 16 hours.

2. The matrix material of claim 1 wherein the pore size distribution is from about 200 to 500 Angstroms.

3. A method for producing a monodispersed mesoporous aluminosilicate matrix material comprised of about 5 to 40% by weight of alumina with the balance being silica which matrix material is characterized by: (a) having a pore size distribution from about 200 to about 500 Angstroms, and (b) a 0 ppm $^{27}$Al MASNMR peak after steaming at 1400° F. for 16 hours, which is no more than 10% greater than any other MASMNR peak, and (c) no more than 40% of the surface area is lost after steaming at 1400° F. for 16 hours, which process comprises: (i) blending an effective amount of an acidic aluminum salt solution at a pH of about 2.5 to 6 with a monodispersed silica gel having an average particle size from about 200 to 500 Angstroms; (ii) adding to and further blending with the blend of (a) above, an effective amount of a basic solution to raise the pH of the resulting blend to about 3 to 9; and (iii) drying the blend at a temperature from about 80 to about 220° C.

4. The method of claim 3 wherein the acidic aluminum salt is selected from the group consisting of aluminum sulfate, aluminum nitrate, and aluminum chloride.

5. The method of claim 4 wherein the acidic aluminum salt is aluminum sulfate.

6. The method of claim 3 wherein the basic solution is an aqueous aluminate solution.

7. The method of claim 6 wherein the aluminate of the solution is selected from the group consisting of sodium aluminate and potassium aluminate.

8. The method of claim 5 wherein the basic solution is an aqueous sodium or potassium aluminate solution.

9. The method of claim 3 wherein the pH of step (i) is from 2.5 to 5.5.

10. The method of claim 3 wherein the pH of step (ii) is from 3 to 6.

11. The method of claim 8 wherein the pH of step (i) is from 2.5 to 5.5 and the pH of step (ii) is from about 3 to 6.

12. The method of claim 3 wherein the drying of step (iii) is conducted at a temperature from about 100 to to 140° C.

13. The method of claim 11 wherein the drying of step (iii) is conducted at a temperature from about 100 to to 140° C.

14. A catalyst composition of a monodispersed mesoporous aluminosilicate catalyst matrix material comprised of: (i) about 5 to 40% by weight alumina with the balance being silica, which matrix material is characterized (a) as having a pore size distribution from about 200 to about 500 and (b) the substantial absence of an $^{27}$Al MASNMR peak after steaming at 1400° F. for 16 hours, and (c) no more than 40% of the surface area is lost after steaming at 1400° F. for 16 hours, and (ii) a crystalline aluminosilicate.

15. The catalyst composition of claim 14 wherein the matrix material has a pore size distribution is from about 100 to 400 Angstroms.

16. The catalyst composition of claim 15 wherein the crystalline aluminosilicate is a zeolite.

17. The catalyst composition of claim 16 wherein the zeolite is a faujasite selected from zeolite X, zeolite Y, and ultrastable zeolite Y.

18. A method for preparing a catalyst composition which method comprises: (i) blending an effective amount of an acidic aluminum salt solution at a pH of about 2.5 to 6 a monodispersed silica sol having an average particle size from about 200 to 500 Angstroms and a zeolite; (ii) adding to and further blending with the blend of (a) above, an effective amount of a basic solution to raise the pH of the resulting blend to about 3 to 9; and (iii) drying the blend at a temperature from about 80° C. to about 220° C.

19. The method of claim 18 wherein the acidic aluminum salt is selected from the group consisting of aluminum sulfate, aluminum nitrate, and aluminum chloride.

20. The method of claim 19 wherein the acidic aluminum salt is aluminum sulfate.

21. The method of claim 18 wherein the basic solution is an aqueous aluminate solution.

22. The method of claim 21 wherein the aluminate of the solution is selected from the group consisting of sodium aluminate and potassium aluminate.

23. The method of claim 20 wherein the basic solution is an aqueous sodium or potassium aluminate solution.

24. The method of claim 18 wherein the pH of step (i) is from 2.5 to 5.5.

25. The method of claim 18 wherein the pH of step (ii) is from 3 to 6.

26. The method of claim 23 wherein the pH of step (i) is from 2.5 to 5.5 and the pH of step (ii) is from about 3 to 6.

27. The method of claim 18 wherein the drying of step (iii) is conducted at a temperature from about 100° C. to to 140° C.

28. The method of claim 26 wherein the drying of step (iii) is conducted at a temperature from about 100° C. to to 140° C.

29. The method of claim 18 wherein the crystalline aluminosilicate is a faujasite selected from zeolite X, zeolite Y, and ultrastable zeolite Y.

30. The method of claim 22 wherein the acid aluminum salt is selected from the group consisting of aluminum sulfate, aluminum nitrate, and aluminum chloride; and the crystalline aluminosilicate is a faujasite selected from zeolite X, zeolite Y, and ultrastable zeolite Y.

31. The method of claim 30 wherein the crystalline aluminosilicate is a faujasite selected from zeolite X, zeolite Y, and ultrastable zeolite Y.

* * * * *